(12) United States Patent
Nakahira

(10) Patent No.: US 8,650,276 B2
(45) Date of Patent: Feb. 11, 2014

(54) COMMUNICATION CONTROL APPARATUS FOR CONTROLLING QOS ACCORDING TO APPLICATIONS AND NETWORK STATE

(75) Inventor: Yoshihiro Nakahira, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 304 days.

(21) Appl. No.: 13/016,300

(22) Filed: Jan. 28, 2011

(65) Prior Publication Data

US 2011/0185052 A1 Jul. 28, 2011

(30) Foreign Application Priority Data

Jan. 28, 2010 (JP) ................................. 2010-017099

(51) Int. Cl.
*G06F 15/16* (2006.01)
(52) U.S. Cl.
USPC .......................................................... 709/223
(58) Field of Classification Search
USPC ................................................. 709/223–226
See application file for complete search history.

(56) References Cited

U.S. PATENT DOCUMENTS

| | | | |
|---|---|---|---|
| 7,613,126 B1 * | 11/2009 | Natarajan et al. ............. 370/252 |
| 2003/0081613 A1 * | 5/2003 | Yamanaka ................ 370/395.21 |
| 2003/0097460 A1 * | 5/2003 | Higashiyama et al. ........ 709/232 |
| 2003/0152096 A1 * | 8/2003 | Chapman ...................... 370/412 |
| 2007/0050492 A1 * | 3/2007 | Jorgensen ..................... 709/223 |
| 2007/0064604 A1 * | 3/2007 | Chen et al. ..................... 370/230 |
| 2007/0180119 A1 * | 8/2007 | Khivesara et al. ............. 709/226 |
| 2008/0052387 A1 * | 2/2008 | Heinz et al. ................... 709/223 |
| 2008/0275983 A1 * | 11/2008 | Ullmann et al. ............... 709/224 |
| 2009/0116495 A1 * | 5/2009 | Lejkin et al. .............. 370/395.21 |
| 2009/0271512 A1 * | 10/2009 | Jorgensen ..................... 709/224 |

FOREIGN PATENT DOCUMENTS

JP 2009-049458 A 3/2009

OTHER PUBLICATIONS

Tomoaki Tsugawa, et al., "Implementation and evaluation of an inline network measurement algorithm and its application technique", the Institute of Electronics, Information and Communication Engineers (IEICE), Technical Report of IEICE, Information Networks 105 (472), pp. 61-66, Dec. 8, 2005.

* cited by examiner

*Primary Examiner* — Hadi Armouche
*Assistant Examiner* — Christopher C Harris
(74) *Attorney, Agent, or Firm* — Rabin & Berdo, P.C.

(57) ABSTRACT

In a communication control apparatus controlling communications between terminals and network devices, the terminal communication optimizer includes a first acquiring section for acquiring first information indicating applications running on the terminal and their destinations, and a setting section for setting QoS for each application according to second information indicating an instruction. The communication optimizer includes a second acquiring section for acquiring third information indicating the QoS requisite for each application indicated by the first information and fourth information about the state of the network, a deciding section for deciding whether or not there are network resources requisite for the applications indicated by the first information, and a communication instructing section for performing communications, when the network resources are insufficient, with higher communication priority applications communicating at a first QoS and lower communication priority applications communicating within the limit not deteriorating the first QoS.

20 Claims, 15 Drawing Sheets

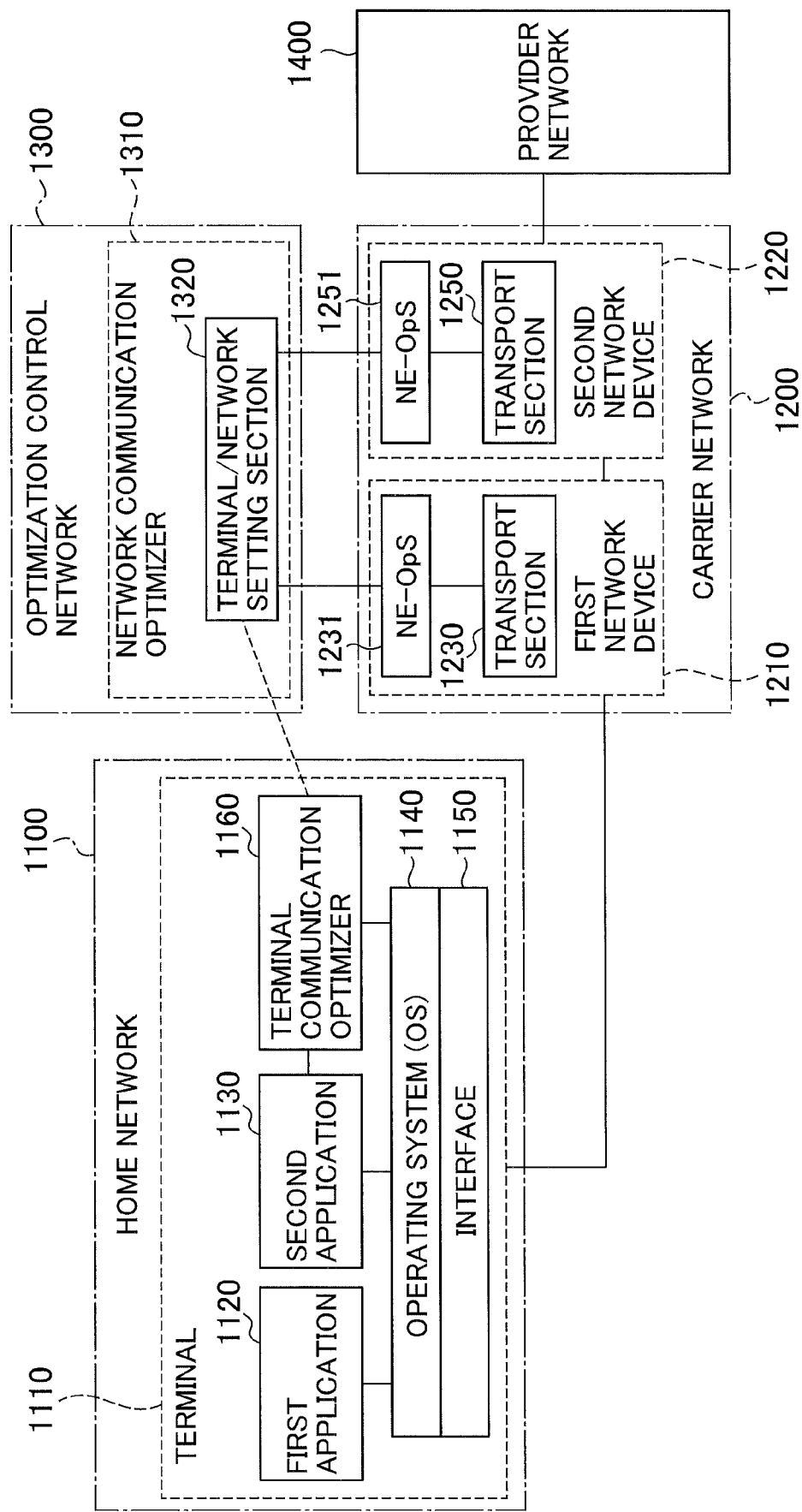

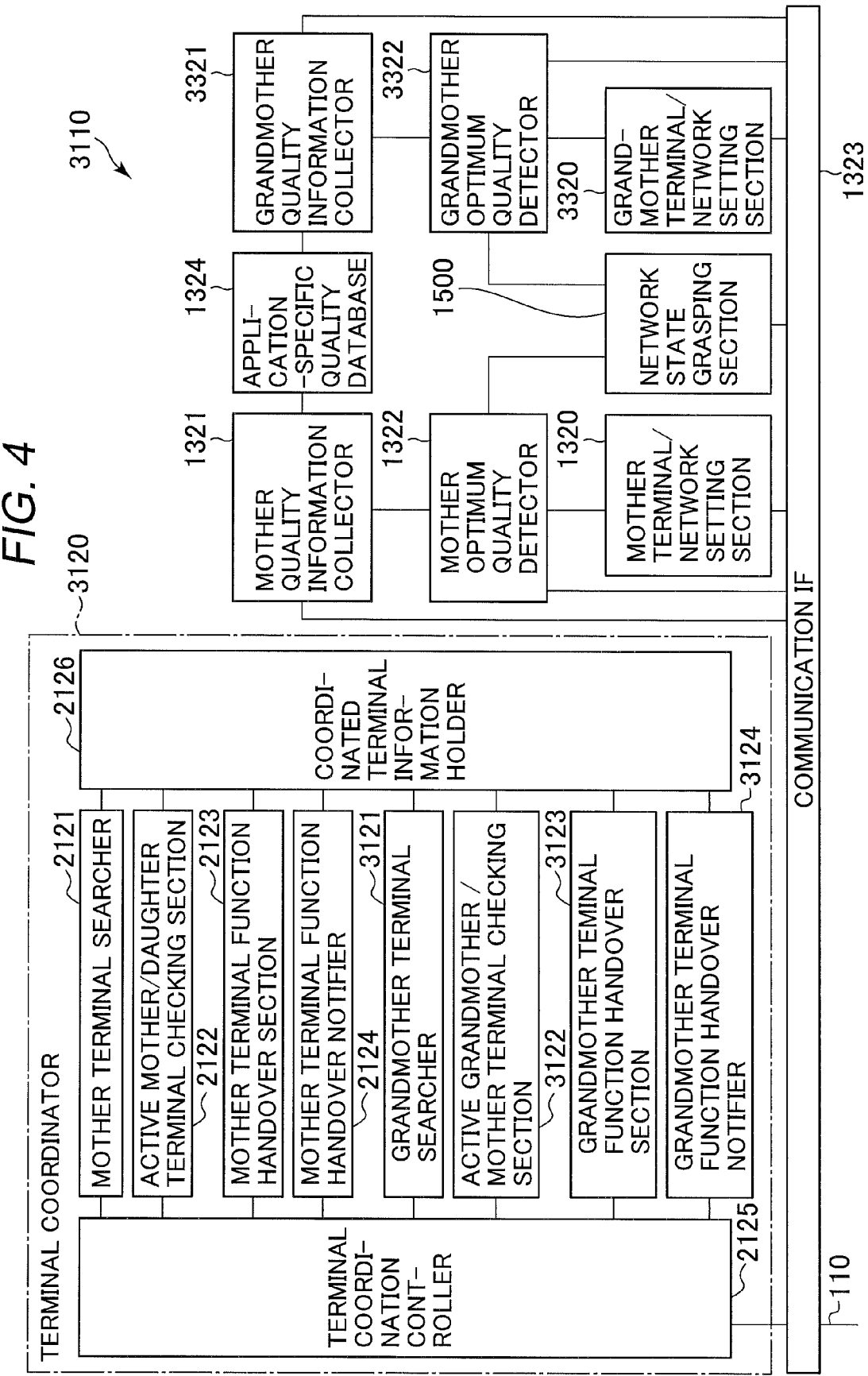

COMMUNICATION CONTROL APPARATUS FOR CONTROLLING QOS ACCORDING TO APPLICATIONS AND NETWORK STATE

BACKGROUND OF THE INVENTION

1. Field of the Invention

The present invention relates to a communication control apparatus, and more particularly to such an apparatus for use in a telecommunications network system for controlling Quality of Service (QoS), such as communication bandwidth, delay time or packet drop rate, on a communication terminal device when connected to the network and executing communication application software.

2. Description of the Background Art

Today, there are a wide variety of communication application services, such as telephony, WEB (world wide WEB) browsing, file transfers and VoD (Video on Demand). Such communication application services also require establishing various kinds of QoSs, such as communication bandwidth, delay time and packet drop rate. Accordingly, if it is possible to accomplish appropriate QoS specific to communication application services, then the user can enjoy communication application services with higher QoS or Quality of Experience (QoE).

For example, a case will now discussed where via the Internet a motion picture stream is being received and reproduced in foreground and, at the same time, free software, used later on, is downloaded in background. If the communication bandwidth is not sufficient, a communication bandwidth, which is necessary for receiving motion picture streams requiring higher levels of quickness and continuity, is first reserved. Subsequently, over the remaining communication bandwidth, free software not requiring high levels of quickness and continuity is downloaded. Interruption of the reproduction of motion picture streams will thereby be infrequent and the QoE will be improved.

Conventionally, solutions for utilizing network resources are proposed to establish QoS specific to communication application services. For example, there are an IntServ (Integrated Services)-based architecture and a DiffServ (Differentiated Services)-based architecture.

In the IntServ-based architecture, communications are performed with a communication bandwidth reserved between endpoints, e.g. between a terminal unit and a server on a provider network. A typical protocol of the IntServ is RSVP (Resource reSerVation Protocol) regulated in RFC (Request For Comments) 2205. In the IntServ-based architecture, a communication bandwidth can reliably be reserved, but every communication device between the endpoints must be constructed so as to enable a certain protocol available. If any of the communication devices between endpoints does not comply with the certain protocol to be used, the IntServ system would not operate. Today, devices complying with this architecture are not widespread, and the IntServ-based architecture is rarely used.

In the DiffServ-based architecture, communications are performed with classes of service (CoSs) set for plural kinds of communication application services and with a QoS class selected which is appropriate for a communication application service. Typical protocols of the DiffServ-based architecture are regulated in RFC2474. Communication devices capable of coping with the DiffServ-based architecture operate according to values set in the DSCP (Differentiated Services Code Point) of the TOS (Type Of Service) field of packets while other communication devices not complying with the DiffServ-based architecture perform communications with the QoS class neglected. The DiffServ-based architecture is based on the policy that priority is given first to the possibility of delivering data, at any rate, rather than the reliable reservation of QoS so as to operate the system to establish the required QoS with best effort.

Incidentally, as prior arts preceding the present invention, there are Japanese patent laid-open publication No. 2009-049458, and Tomoaki Tsugawa, et al., "Implementation and evaluation of an inline network measurement algorithm and its application technique", the Institute of Electronics, Information and Communication Engineers (IEICE), Technical Report of IEICE, Information Networks 105 (472), pp. 61-66, Dec. 8, 2005.

Under the current circumstances, not only the IntServ-based architecture, which requires that every communication device complies with a certain protocol, but also the DiffServ-based architecture, which does not always require that communication devices comply with a certain protocol, are not sufficiently widespread and utilized. The circumstances might be caused by the following problems.

As the first problem, most of communication application software, which may sometimes simply referred to as "application", are not adapted for controlling the QoS on communications. In addition, as the second problem, if an application is adapted for controlling the QoS, a request issued by the application is not always appropriate. For example, an application, which is not important in practice, e.g. in level of quickness and continuity, may issue a request for communications with top priority. In that case, if communication devices unconditionally accept such a request from the application, traffic congestion may be caused over the whole network, and the QoS of really important communications, e.g. requiring higher levels of quickness and continuity, may deteriorate.

As the third problem, since communications requested by one and the same application may be higher in priory in some cases and lower in other cases, it may be impossible to definitely allot priority to the communication to the kind of the application. For example, the communication priorities may differ from a case where the WEB browser is currently downloading data on a website interesting to a user on communications, i.e. information requiring a higher level of quickness is being received, to another case where the WEB browser is prefetching and downloading in advance in background data which is more probable in being used later, i.e. information requiring a lower level of quickness is being received.

As the fourth problem, the terminal or its OS (Operating System) does not always comply with the QoS control. In addition, as the fifth problem, the QoS control functions, which include a function of setting a communication bandwidth and delay time for each process, may not be unified between the network devices. Moreover, as the sixth problem, even if the state of usage of the network is notified to a terminal unit, its OS or an application running on the terminal unit, they do not always have a mechanism of utilizing the information transmitted to the terminal unit for QoS control. Furthermore, as the seventh problem, even if the network equipment can be notified of control information with the terminal unit or its OS, the network equipment does not always have functions of recognizing an application used by the user and the state of utilization of the network, and of then calculating the operational variables for optimum control of the QoS.

Some of the first to seventh problems may be overcome even by existing solutions. For example, since most of ATM (Asynchronous Transfer Mode) terminals can perform communications with a specified QoS, the fourth problem may be solved by using such ATM terminals. Furthermore, the fifth problem may be solved by using network nodes having functions based on the DiffServ-based architecture.

However, networks widespread under the current circumstances are not adapted to provide a plurality of applications with QoSs appropriate for the respective resources. Because, the first to seventh problems are interrelated with each other so that solutions to the first to seventh problems would, when combined, not result in appropriate operation as a whole. For example, when a plurality of ATM terminals are prepared and connected to the nodes of DiffServ system, the fourth and fifth problems would both literally be solved. However, in practice, such a connected system would not perform communications with the QoS well controlled because general nodes of the DiffServ system have no mechanism of recognizing requests for the QoS of ATM terminals.

SUMMARY OF THE INVENTION

It is an object of the present invention to provide a communication control apparatus in which the QoEs of communication services can be improved.

In accordance with the present invention, a communication control apparatus controls the QoSs according to communication application software under execution on a terminal unit connected to a telecommunications network and according to the state of usage of the telecommunications network.

In accordance with the present invention, a communication control apparatus for controlling communications between a terminal and a network device comprises a first communication optimizer and a second communication optimizer. The first communication optimizer includes a first acquiring section for acquiring first information about applications running on the terminal and communication destinations of the applications; a transferring section for transferring the first information to the second communication optimizer; and a setting section for setting QoS for each of the applications according to the second information which is instruction information from the second communication optimizer. The second communication optimizer includes a second acquiring section for acquiring third information indicating QoS requisite for the application indicated by the first information and fourth information about a state of the network; a deciding section for deciding, on the basis of the third and fourth information, whether or not there is a network resource requisite for the application indicated by the first information; and a communication instructing section for determining the second information according to a result from a decision of the deciding section. The communication instructing section applies to the second information, if there are the network resources requisite for the applications, the instruction information instructing communications at the QoS requisite for each application, and, if the network resources are insufficient for the applications, another instruction information instructing the terminal and the network device to set resource assignment and a transmitting order so that a higher communication priority application communicates at a first QoS and a lower communication priority application communicates within a limit not deteriorating the first QoS. The second communication optimizer further includes a transmitting section for transmitting the second information to the first communication optimizer and to the network device.

According to the present invention, it is possible to accomplish the advantage that the QoEs of communication services can be improved by controlling the QoSs according to a communication application software in execution on the terminal connected to the communication network and according to the state of usage of the communication network.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing major components of a telecommunications network system including a communication control apparatus in accordance with a first embodiment of the present invention;

FIG. 4 is a schematic block diagram showing a second communication optimizer in a communication network including a communication control apparatus in accordance with a third embodiment of the present invention;

DESCRIPTION OF THE PREFERRED EMBODIMENTS

Figure 2A:
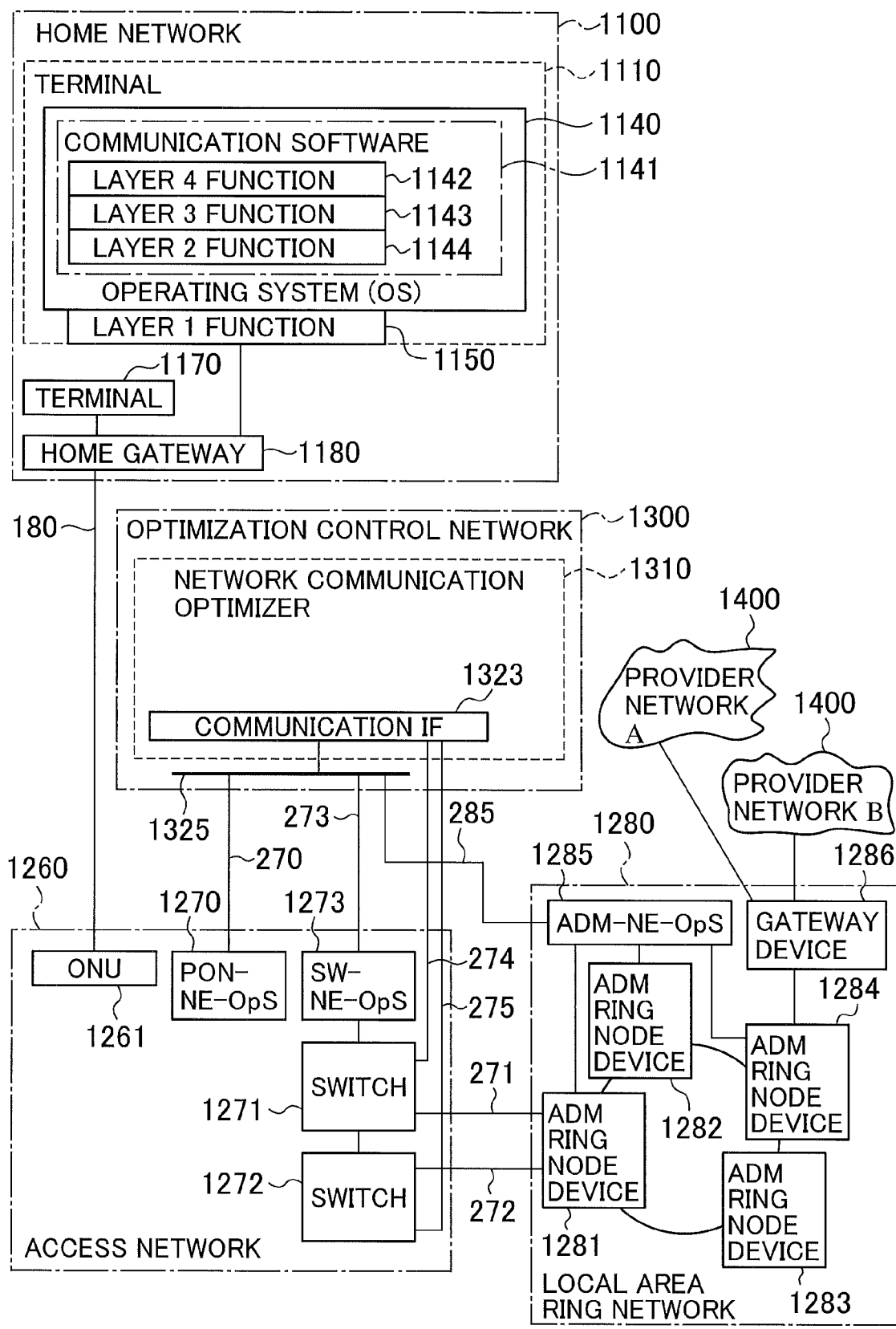
FIGS. 2A to 2D are schematic block diagrams showing the system including the communication control apparatus according to the first embodiment.

The first through fifth embodiments will be described which are directed to a communication control apparatus adapted to control Quality of Service (QoS), such as communication bandwidth, delay time, packet or data drop rate, or the like, according to communication application software, which may simply be referred to as "application", under execution on a communication terminal connected to a telecommunications network and according to the state of usage of the network, thereby improving Quality of Experience (QoE) of an communication service provided to the user. In particular, when the network is congested, the communication control apparatus preferentially secures the QoS of communications having higher priority, such as teleconferences, while lowering the priority of non-urgent communications, such as file transfers in background, to thereby improve the QoE to the user.

Specifically, in the first embodiment, a communication terminal grasps an application used and the network performs determination for optimizing the QoS and controls network equipment. In the second embodiment, a communication terminal grasps an application used as well as performs determination for optimizing the QoS and controls network equipment. The third embodiment can enlarge the scope from what the second embodiment can cover. In the fourth embodiment, an overlay network, such as a P2P (Peer-to-Peer) network or a VPN (Virtual Private Network) built on a carrier network is employed. The fifth embodiment is adapted to control and level off the peak power with the functions of the first through fourth embodiments being used. In the present specification, the term "terminal" may refer to a communication device connected to a telecommunications network, such as a server, a client computer, per-to-per connected computers or an application-specific device.

The illustrative embodiments of the communication control apparatus will be depicted and described as configured by separate functional blocks. It is however to be noted that such a depiction and a description do not restrict the communication control apparatus to an implementation only in the form of hardware but at least the communication control apparatus per se may partially or entirely be implemented by software, namely, by a computer, or processor system, which has a computer program installed and functions, when executing the computer program, as part of, or the entirety of, the communication control apparatus. In this connection, the word "circuit" or "section" may be understood not only as hardware, such as an electronics circuit, but also as a function that may be implemented by software installed and executed on a computer or processor system.

Now, the first embodiment of the present invention will be described in detail with reference to FIGS. 1 and 2A to 2D. FIG. 1 schematically shows major components of a system including the communication control apparatus in accordance with the first embodiment of the present invention. As shown in FIG. 1, a communication network to which the communication control apparatus is applied is configured, for example, to include a home network 1100, a carrier network 1200, a provider network 1400 and an optimization control network 1300, which are connected as illustrated. The carrier network 1200 is configured as including an access network and another network in a specific area, such as a state, a province, a prefecture, a city or a town, i.e. a local area network, which may be referred to as a local area ring network.

The home network 1100 may have at least one communication terminal 1110 which is located therein and has a first application 1120, a second application 1130, an operating system (OS) 1140, a physical interface (IF) 1150 and a terminal communication optimizer 1160. The applications 1120 and 1130 may be communication application software programs. For example, the optimizer 1160 also may be a software program running on the OS 1140. The home network 1100 is connected to the carrier network 1200 via the interface 1150.

In the carrier network 1200, network equipment, e.g. first and second network devices 1210 and 1220, is located. The first and second network devices 1210 and 1220 in the carrier network 1200 transport user data to be transmitted between the terminal 1110 of the home network 1100 and the provider network 1400. In the devices 1210 and 1220, transport sections 1230 and 1250 are controlled by NE-OpSs (Network Element Operation Systems) 1231 and 1251, respectively.

The optimization control network 1300 is provided with a network communication optimizer 1310 having a terminal/network setting section 1320. The optimization network 1300 communicates with the terminal communication optimizer 1160 and with the NE-OpSs 1231 and 1251.

The communication control apparatus of the first embodiment thus includes the terminal communication optimizer 1160 and a network communication optimizer 1310 both acting as communication optimizing functional sections. The remaining sections or components may be implemented by existing devices.

The terminal communication optimizer 1160 transmits information requisite for the QoS, which may simply be referred to as "QoS information", or first information, which indicates applications running on the terminal and communication destinations of the applications, to the network communication optimizer 1310 by proxy for the first and second applications 1120 and 1130 and the OS 1140. The terminal communication optimizer 1160 operates as such to thereby solve the problem that the terminal 1110 would otherwise have no compliance with the control of the QoS.

The first information may include information on whether the application is running in foreground or in background and/or information based on operation by the user. The network communication optimizer 1310 acquires network resource information possessed by the network devices, determines optimum QoSs, e.g. by calculating or operating, and controls the QoSs for the terminal 1110 and the network devices individually. Accordingly, the optimizer 1310 enables the control of the QoSs, even if the mechanisms of the network devices for controlling the QoS are different from each other.

Incidentally, there is a prior art using the RACF (Resource and Admission Control Function) of NGN (Next Generation Network) that controls acceptance of requests from the terminal. However, the RACF merely makes a decision on whether a connection is accepted (OK) or rejected (NG), but does not perform the operation for narrowing the communication bandwidth to be used for an application carrying out lower priority communications. In addition, every network device arranged in the NGN needs to comply with the NGN. By contrast, the communication control apparatus of the first embodiment enables the control of the QoS by absorbing differences in control IF between the network devices to thereby enhance the QoE of the user, especially the connection quality, with the currently possessed resources.

Figure 2B:
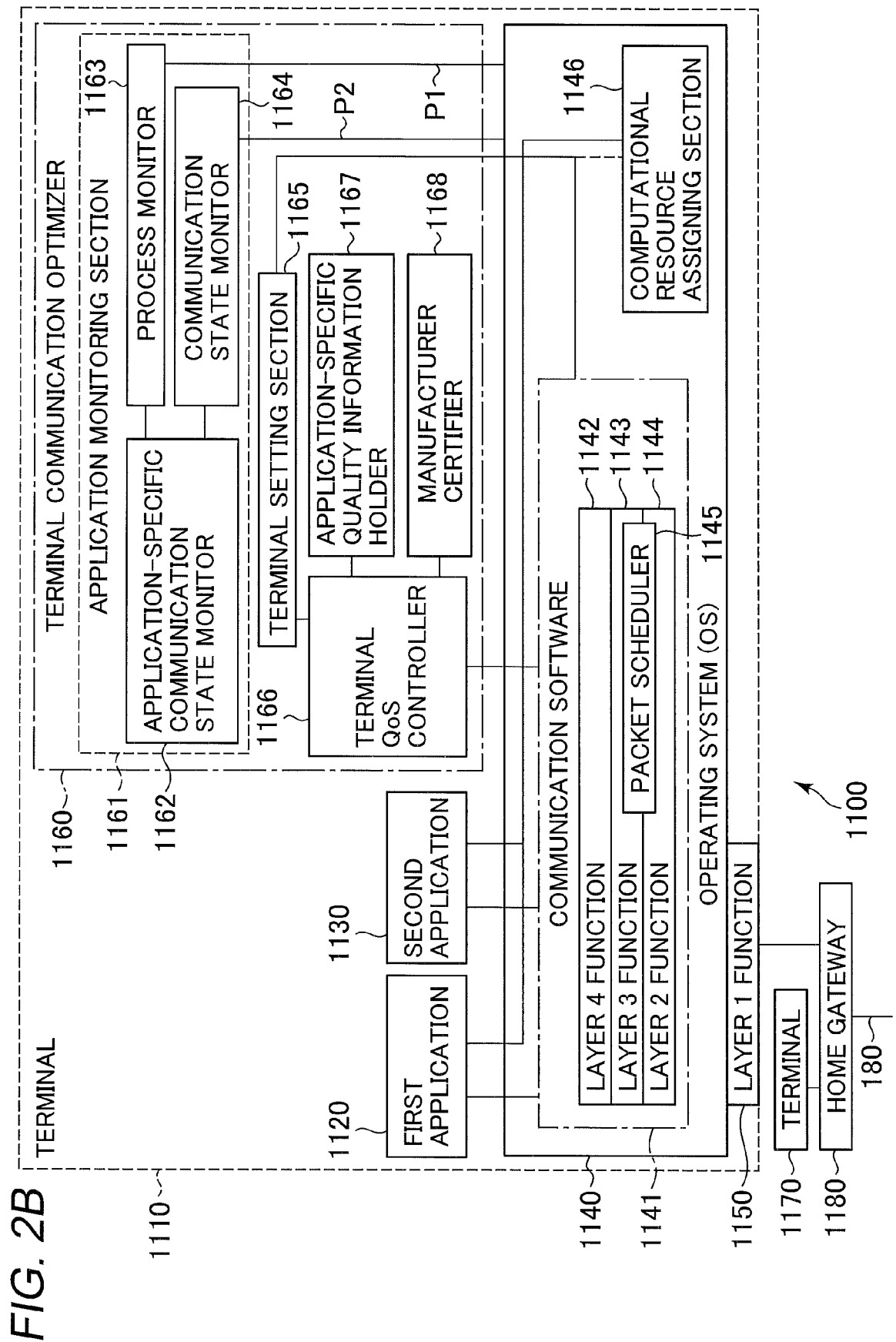

Now, with reference to FIGS. 2A to 2D, the configuration of the system including the communication control apparatus of the first embodiment will be described. As shown in FIGS. 2A and 2B, the home network 1100 is configured, for example, to include terminals or personal computers 1110 and 1170 and a home gateway 1180, which are interconnected as depicted. The home network 1100 may be a LAN (Local Area Network) for use in an enterprise.

Figure 2C:
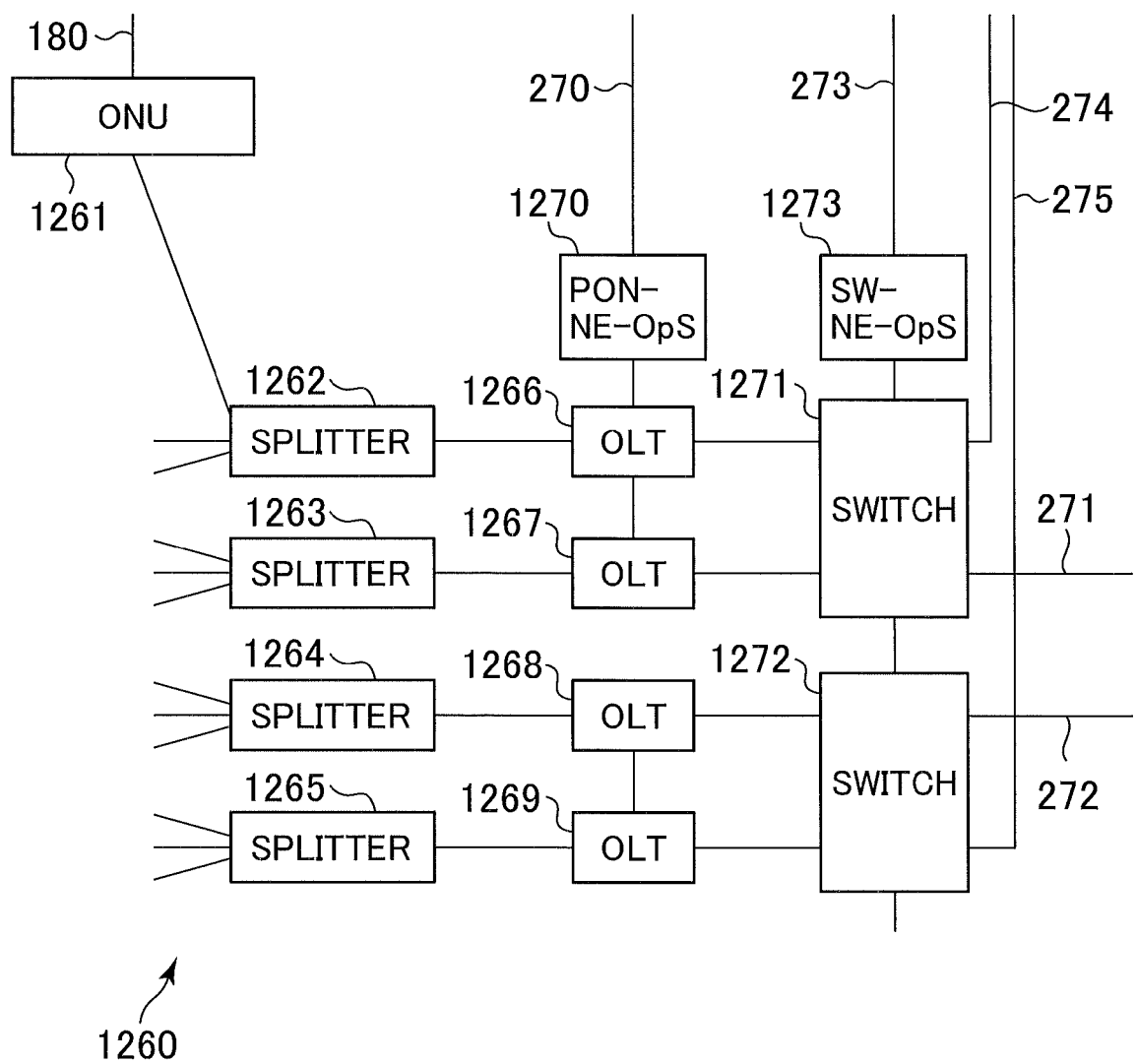

As shown in FIGS. 2A and 2C, the access network 1260 is configured, for example, to include an ONU (Optical Network Unit) 1261, splitters 1262, 1263, 1264 and 1265, OLTs (Optical Line Terminals) 1266, 1267, 1268 and 1269, a PON (Passive Optical Network)-NE-OpS 1270, switches 1271 and 1272, and an SW (Switch)-NE-OpS 1273, which are interconnected as illustrated.

As shown in FIG. 2A, a local area ring network 1280 is configured, for example, to include ADM (Add/Drop Multiplexing) ring node devices 1281, 1282, 1283 and 1284, an ADM-NE-OpS 1285, and a gateway device 1286, which are interconnected as illustrated.

The OS 1140 of the terminal 1110 is provided with communication software 1141 and a computational resource assigning section 1146. For instance, the communication software 1141 may comprise OSI (Open Systems Interconnection) layer 4, the layer 4 function, 1142, layer 3, the layer 3 function, 1143, layer 2, the layer 2 function, 1144, and a packet scheduler 1145. The assigning section 1146 assigns the CPU (Central Processor Unit) time to various applications and runs the applications according to the respective, assigned times.

In an example shown in FIGS. 2A and 2C, the access network 1260 is configured to comprise devices using the PON. The access network 1260 receives an output 180 from the home network 1100 by the ONU 1261, or, in practice, receives outputs from a plurality of home networks by a respective plurality of ONUs. The network 1260 also has the splitters 1262 to 1265 which combine signals from the ONUs 1261, and has the OLTs 1266 to 1269 which receive the combined signals. In addition, the network 1260 collects the outputs from the OLTs 1266 to 1269 to the WANs (Wide Area Networks) at the switches 1271 and 1272, which select a signal for transmitting the latter to the local area ring network 1280 including the ADM ring node devices 1281 and 1284. For instance, the switches 1271 and 1272 may be connected with the ADM ring node device 1281 via lines 271 and 272, respectively. The local area ring network 1280 thus collects traffic, and then the single gateway device 1286 couples the collected traffic to the provider network 1400, such as provider network A or B.

Figure 2D:
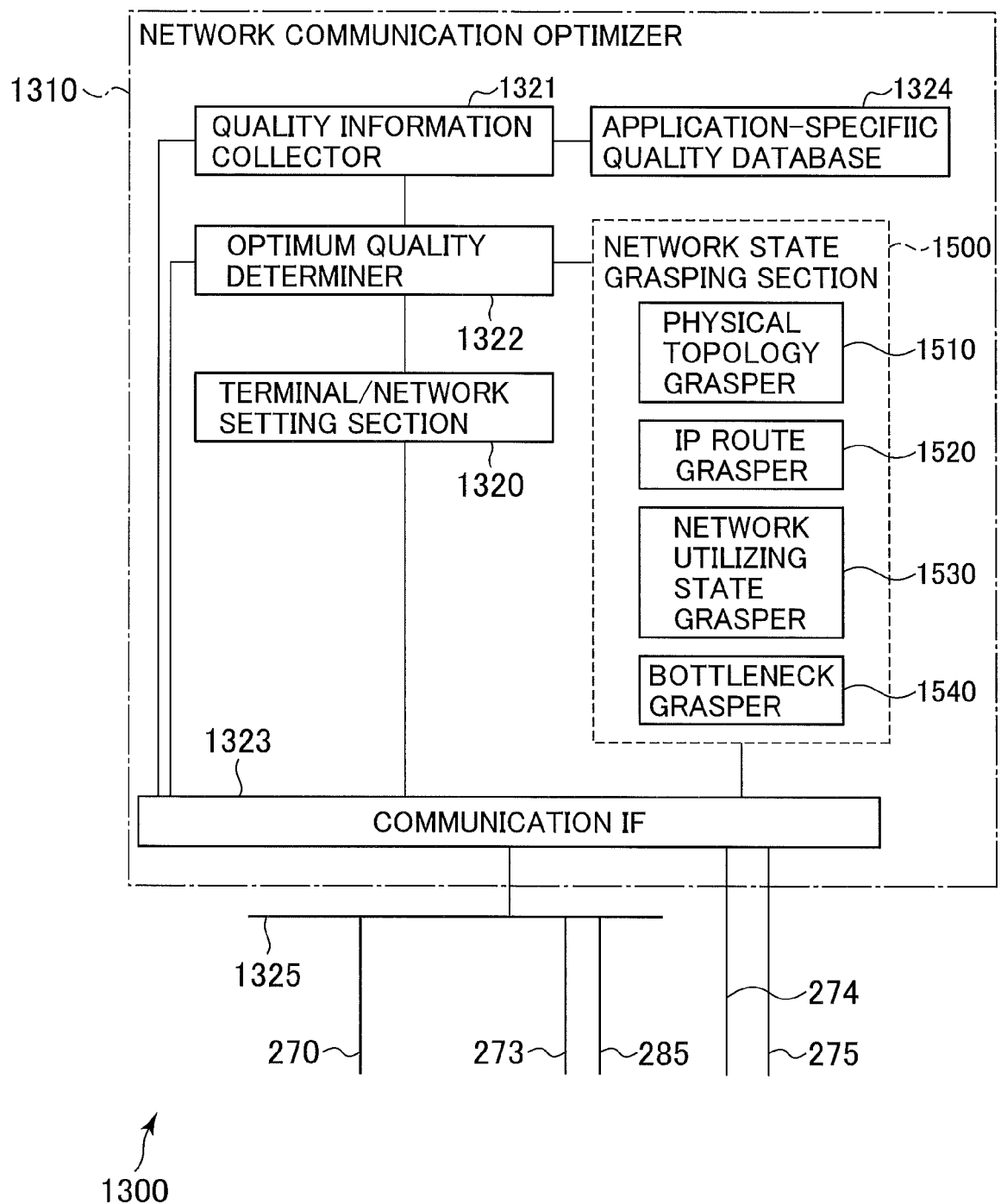

As shown in FIGS. 2A and 2D, the optimization control network 1300 is configured, for example, to include a circuit 1325, a circuit or network line, and the network communication optimizer 1310. The circuit 1325 communicates with the NE-OpSs controlling the various network devices, for instance, with the PON-NE-OpS 1270, SW-NE-OpS 1273 and ADM-NE-OpS 1285 over lines 270, 273 and 285. The optimization control network 1300 of the present invention is however not restricted to such a configuration.

As an example of the terminal 1110 shown in FIGS. 2A and 2B, there is a case where the first application 1120 serving as a WEB browser communicates with a server of a first provider and the second application 1130 serving as VoIP (Voice over Internet Protocol) software communicates with a user of a second provider. In this case, communication data is transmitted via the communication software 1141 of the OS 1140 and the physical interface 1150, i.e. layer 1, the layer 1 function, to the home gateway 1180. The communication data is further transmitted to the access network 1260 shown in FIGS. 2A and 2C to go through the ONU 1261, splitter 1262, OLT 1266 and switch 1271, and further, transmitted to the local area ring network 1280 to go through the ADM ring node device 1281 and gateway device 1286, and, finally, transmitted to the provider network 1400.

The switches 1271 and 1272 of the access network 1260 collect signals from the multiple OLTs 1266 to 1269 and select one of the signals to transmit it to the ADM ring node devices 1281 to 1284. Furthermore, the switches have a function of separating control signals 274 and 275 transmitted to a communication interface 1323 of the network communication optimizer 1310 from user signals. The function of separating the control signal from the user signals may be implemented in the OLTs 1266 to 1269.

As shown in FIG. 2B, the terminal communication optimizer 1160 installed on the terminal 1110 comprises an application monitoring section 1161, a terminal QoS controller 1166, an application-specific quality information holder 1167, a terminal setting section 1165 and a manufacturer certifier 1168. The application monitoring section 1161 includes an application-specific communication state monitor 1162, a process monitor 1163 and a communication state monitor 1164. The process monitor 1163 acquires process names and process identifications (IDs). The communication state monitor 1164 acquires a list of process ID under communication and information about 5-tuple, described later. The application-specific communication state monitor 1162 checks the acquired information, obtains the process names under communication and the information about the 5-tuple, transmits them to the network communication optimizer 1310 of the optimization control network 1300, and controls communications so as to be performed with the QoS indicated by a response from the optimizer 1310.

As shown in FIGS. 2A and 2D, the network communication optimizer 1310 is configured to include the communication IF (interface) 1323, a quality information collector 1321, an optimum quality determiner 1322, the terminal/network setting section 1320, an application-specific quality database 1324 and a network state grasping section 1500.

The quality information collector 1321 communicates with the terminal communication optimizer 1160, and collects and totalizes information about applications and required QoS.

The network state grasping section 1500 is configured to include a physical topology grasper 1510, an IP route grasper 1520, a network utilizing state grasper 1530 and a bottleneck grasper 1540.

The physical topology grasper 1510 acquires information about the physical topology. The IP route grasper 1520 acquires information about the routes along which IP packets are transmitted. The network utilizing state grasper 1530 acquires information about the network resources and the amount of the resources used. The bottleneck grasper 1540 examines bottlenecking sites on the network. Such information is transmitted to the network communication optimizer 1310, particularly the optimum quality determiner 1322.

In addition, the network communication optimizer 1310, particularly the optimum quality determiner 1322, determines, e.g. by calculating or operating, the QoS to be served to each application by each terminal 1110 in accordance with the QoS information collected by the quality information collector 1321 and the information obtained by the network state grasping section 1500. The determined result is transmitted to the terminal/network setting section 1320. The section 1320 instructs the terminal 1110 and the NE-OpS of the network to communicate at the specified QoS.

In the first embodiment, the process monitor 1163 included in the terminal communication optimizer 1160 monitors the application currently running on the OS 1140 to acquire information (reference numeral P1, FIG. 2B) about the name and ID of the running process. The process monitor 1163 grasps active applications and threads on the basis of the state of the image displayed on the display screen, and monitors the operation inputted by the mouse and keyboard to grasp whether the communication is performed by a user's intention or in background, thereby solving the above-mentioned third problem.

For example, it will be described a case where a WEB browser of the terminal runs with two windows on the display screen to perform communications with a TCP (Transmission Control Protocol) connection in all windows so that the terminal carries out transmission for each window at intervals of several to tens seconds. In this case, one window of the WEB browser is operated by the user manipulating the keyboard and mouse while the other window of the WEB browser is not manipulated with the keyboard and mouse. When the WEB browser window being manipulated with the keyboard can be estimated to be used for writing a WEB mail or filling in a questionnaire form, it can be estimated that the communication priority for the one window is higher. On the other hand, when the other window of the WEB browser without receiving an effective manipulation of the keyboard or mouse can be estimated to be used for communicating regularly, for instance, carrying out only process of regularly reading and replacing advertisements by the JAVA script, it can be estimated that the communication priority for the other window is lower. As a more specific example, in another case where the connection destination, i.e. the website, on the window being manipulated with the mouse is a map information service on the network, such as Google Maps (trademark), the window can possibly be estimated to be used for opening a map and enlarging or moving it, so that it can be estimated that the communication priority is higher.

The process monitor 1163 compares the URL (Uniform Resource Locator) of the information displayed on the WEB browser with the contents of the communication and can decide on the basis of the result of the comparison whether the information is prefetched or currently required. For instance, when the display on the WEB browser is changing successively at short intervals and containing communication data currently updated, it cannot be estimated that the information is prefetched. By contrast, when communications are being performed although the display on the WEB browser is not changed, it can be estimated that the information is prefetched. To make this estimation more reliable, the process monitor 1163 inspects the contents of the communication and compares text contents and graphics files according to the communication with the information displayed on the screen. From this comparison, if they are the same, the monitor decides that the communicating contents are data being updated, or if communicating text or image files does not appear on the screen, it can be estimated that the information is prefetched.

The communication state monitor 1164 monitors the Socket IF used for communications by the communication software 1141 of the OS 1140, and acquires information (reference numeral P2, FIG. 2B) about the process IDs of the application using each socket and about 5-tuple (IP address and port number of the originator, IP address and port number of the destination, and protocol number) used for the communications.

The application-specific communication state monitor 1162 checks and inspects the information obtained from the process monitor 1163 and the communication state monitor 1164 on the basis of the coincident process IDs, and obtains information on an application of which process name is performing communications with which destination (IP address of the destination) by using which port and which protocol. Furthermore, the communication state monitor 1162 acquires information, such as the amount of traffic, the state of ACK (ACKnowledgement) of the TCP and the state of the transmitter queue, about the state of the communication of the terminal 1110. The acquired information is transmitted via the terminal QoS controller 1166, communication software 1141 and home gateway 1180 to the access network 1260, to go through the ONU 1261, splitters 1262 to 1265, OLTs 1266 to 1269, switches 1271 to 1272 and other devices, and finally transmitted to the optimization control network 1300 to enter the communication IF 1323 of the network communication optimizer 1310.

The terminal communication optimizer 1160 may be implemented in the form of software installed in the terminal or stored in a USB (Universal Serial Bus) connectable module connected with the terminal unit to monitor the application on the terminal, thereby solving the above-mentioned first problem. Alternatively, the software may be installed in the home gateway 1180 or ONU 1261 to estimate the application from information about the communication traffic, or the application may be inspected by remotely logging in the terminal 1110.

In the communication control apparatus, communication between the terminal communication optimizer 1160 and the network communication optimizer 1310 may be encrypted, and the optimizer 1160 may include the manufacturer certifier 1168 for holding information certifying the manufacturer of the optimizer 1160 to thereby certify that the optimizer 1160 has been manufactured by an entity reliable to the network administrator, thereby solving the above-mentioned second problem, i.e. checking that the QoS information required by each application is correct. The certifier 1168 is also connected with the terminal QoS controller 1166 via a tamper resistant communication route to authenticate, and certifies that the subject of communication is an authorized subject free from forgery, counterfeiter or tamperer. In addition, the certifier 1168 may be implemented, for example, by employing a technique for use in a commuter pass in the form of IC (Integrated Circuit) card.

The quality information collector 1321 of the network communication optimizer 1310 collects and checks information transmitted from the each terminal 1110 to compare the transmitted information with the information contained in the application-specific quality database 1324 and to arrange results from the comparison, thereby creating a list of QoS information requisite for each terminal 1110. The listed information is transmitted to the optimum quality determiner 1322. One example of the list is shown in the following Table 1.

TABLE 1

| Application name | Required communication bandwidth | Allowable delay time | Delay fluctuation |
|---|---|---|---|
| YouTube (Video hosting service) | 2 Mb/s | 500 msec | |
| NHK archives (Motion pictures) | 10 Mb/s | 500 msec | |
| Videotelephony | 500 kb/s | 100 msec | 20 msec |
| Videoconference (4 points) | 2 Mb/s | 100 msec | 20 msec |
| EE on-line game | 500 kb/s | 50 msec | 10 msec |
| E-mail | 100 kb/s | 100 sec | |

In the network state grasping section 1500, the physical topology grasper 1510 examines the states of the physical topology and the connected devices in the network on the basis of the NE-OpS information to acquire physical topology information. For example, the topology information contained in the NE-OpS information is table information listed in the following Table 2.

TABLE 2

| Node Number | Connecting node 1 | Connecting node 2 | Connecting node 3 |
|---|---|---|---|
| 1 | 2 | 4 | |
| 2 | 1 | 3 | 5 |
| 3 | 2 | 6 | |
| 4 | 1 | 5 | |
| 5 | 2 | 4 | 6 |
| 6 | 3 | 5 | |

(Example of physical topology)

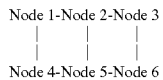

Node 1-Node 2-Node 3
　｜　　　｜　　　｜
Node 4-Node 5-Node 6

The IP route grasper 1520 grasps information, or IP route information, about the route along which packets are routed on a logical IP network on the basis of the routing information held in the respective nodes.

The network utilizing state grasper 1530 obtains physical topology information, IP route information, information about the state of communication of the terminal 1110 transmitted from the respective terminals 1110, and the QoS information measured by the quality measurement section incorporated in the communication device via the NE-OpS. The grasper 1530 in turn uses the obtained information, and forms information about the state of utilizing the network, for example, the bandwidth of communication flowing through the nodes over the links. Examples of the formed information are shown in the following Tables 3, 4 and 5. Tables 3, 4 and 5 as well as Table 2 merely show examples, and therefore Tables 3, 4 and may not agree with Table 2 in physical topology information.

TABLE 3

| | Node number 1 | | | |
|---|---|---|---|---|
| Input IF number | Output IF number | Traffic amount (Mbit/sec) | Average delay time (μsec) | Drop rate |
| 1 | 2 | 100 | 3 | 10E−16 |
| 1 | 3 | 30 | 1 | — |
| 2 | 1 | 70 | 3 | — |
| 2 | 3 | 90 | 12 | — |
| 3 | 1 | 40 | 3 | — |
| 3 | 2 | 130 | 10 | 10E−14 |

TABLE 4

| | node number 2 | | | |
|---|---|---|---|---|
| Input IF number | Output IF number | Traffic amount (Mbit/sec) | Average delay time (μsec) | Drop rate |
| 1 | 2 | 50 | 5 | — |
| 1 | 3 | 80 | 7 | — |
| 2 | 1 | 20 | 3 | — |
| 2 | 3 | 110 | 12 | 10E−16 |
| 3 | 1 | 120 | 13 | 10E−16 |
| 3 | 2 | 30 | 2 | — |

TABLE 5

| Link number | Traffic amount (Mbit/sec) | Error rate |
|---|---|---|
| 1 | 320 | 10E−13 |
| 2 | 210 | 10E−16 |
| 3 | 420 | 10E−16 |
| 4 | 330 | 10E−15 |

Even if the quality measurement section is incorporated in the communication device, a substitute independent quality measuring device may be prepared in the network. Preferably, the network utilizing state information may include not only the traffic amount and bottlenecks grasped but also the available communication bandwidth of the respective terminals 1110. With regard to the available communication bandwidth, the architecture of the inline traffic measuring section disclosed by Tomoaki Tsugawa, et al., described earlier may be used. The bottleneck grasper 1540 uses the state information of the network, and grasps bottlenecks and detects traffic components in the flow to attach the information to the network utilizing state information.

The optimum quality determiner 1322 determines or calculates the optimum QoS to be achieved by the application in the terminal 1110 on the basis of the list of the requisite QoS information for each terminal 1110 and the network utilizing state information. If the network resources are sufficient, resources requisite for each application may be given. In order to give the requisite resources, no control is often needed.

In a case where a bottleneck is caused in the network and the network resources are insufficient, the optimum quality determiner 1322 detects controllable traffic components in the bottleneck section and decides whether or not effective QoS control is possible. If it is, then the optimum quality determiner 1322 reduces the resources for an application having lower communication priority, and reserves resources, e.g. communication bandwidth, requisite for QoS of another application having higher communication priority. Because the optimum quality determiner 1322 can instruct the terminal 1110 of the QoS by using the network congestion information held in an MIB (Management Information Base) or the NE-OpS of the network equipment, thereby solving the above-mentioned sixth problem.

The communication priority may be different from one user to another, and it is therefore preferable that the priority can be set from the outside for each user. Consequently, the communication bandwidth can be assigned on the basis of the state of the application used on the terminal 1110, thereby solving the above-mentioned seventh problem. The determining results of the determiner 1322 are transmitted to the terminal/network setting section 1320.

Based on the transmitted determining results, the terminal/network setting section 1320 instructs the NE-OpS of the respective communication devices on the network to perform communications with the QoS, and also instructs the terminal QoS controller 1166 incorporated in the terminal communication optimizer 1160 to perform communications with the QoS specified by the terminal 1110. The terminal QoS controller 1166 instructs the terminal setting section 1165 to control the communication software 1141, and instructs the layer 1 function 1150 and home gateway 1180 to perform communications with appropriate QoS. Thus, the terminal communication optimizer 1160 and network communication optimizer 1310 are mediated, thereby solving the above-mentioned seventh problem that it would otherwise be impossible to control the QoS due to the terminal 1110 and OS 1140 not complying with the DiffServ-based devices and IntServ-based devices as the network equipment. Furthermore, even if the mechanisms of the network devices for controlling the QoSs are different from each other, the network communication optimizer 1310 absorbs the differences and performs desired operation via the NE-OpS, thereby solving the above-mentioned fifth problem.

For example, there are some specific ways of controlling the QoSs, such as communication bandwidth and delay, as will be described as the first to sixth options.

In the first option, the settings of the packet scheduler 1145 incorporated in the communication software 1141 are modified so as to change the priority and bandwidth of communications of transmitting packets for each application. In a case where the downlink traffic is problematic, the communication bandwidth can be controlled, for example, by lowering the transmission rate of the uplink TCP_ACK signal.

In the second option, the layer 3 function 1143, or layer 3, of the communication software 1141 is controlled to set the field value of the service type of each IP packet according to the communication priority. The second option is advantageous in cases where components of the layer 2 function or below in the communication software 1141, i.e. the layer 2 function 1145, layer 3 function 1144, layer 4 function 1143 and packet scheduler 1145, or network equipment perform priority queuing according to the service type.

In the third option, to a section between the communication software 1141 and a predetermined point located beyond the communication bottleneck in the network, a tunnel is arranged by a tunneling technique, such as VLAN (Virtual LAN), IP-in-IP (IP tunneling protocol) or MPLS (Multi-Protocol Label Switching). Then, the priority and bandwidth of the communication through the tunnel are prepared so as to suit for the application to be used, and the application being necessary for controlling the QoS is transferred via the tunnel. In this option, the network device has to be of the type capable of setting a tunnel.

In the fourth option, communication devices, such as the ONU 1261, OLTs 1266 to 1269 and home gateway 1180, perform priority queuing, which includes shaping and spacing, on the basis of the information about the 5-tuple. In this option, the network communication optimizer 1310 determines the value of the 5-tuple, the communication priority and the QoS to be served and sets the network devices.

In the fifth option, the components of the communication software 1141, which include a driver for the layer 1 function 1150, are used for blocking lower-priority communication traffic and assuring the QoSs of higher-priority communication traffic. That is, those components control the transmitting order of the traffic so that higher communication priority applications communicate at the optimum QoS and lower communication priority applications communicate within the limit not deteriorating the optimum QoS.

In the sixth option, the settings of the computational resource assigning section 1146 are modified, the CPU time of the application is increased or reduced, and the amount of communication is adjusted.

With respect to the extent of equipment on which the QoS is to be controlled and conditions under which the control is effective for accomplishing the advantages of the present invention, for instance, there are several methods from a case where a single terminal is controlled to a case where the whole network is controlled. Now, specific solutions of controlling the QoSs, such as communication bandwidth and delay, will be described as the first to sixth examples.

The first example introduces, as a method of controlling the QoS, a solution of carrying out only the quality control of communications directed to and from a certain terminal. This solution is effective in cases where a bottleneck is caused in the layer 1 function bandwidth of the terminal or the performance of the communication software. For example, there is a case in which the communication bandwidth of the access network is restrictively assigned to a subscriber. When the access network is not a PON but an ADSL (Asymmetric Digital Subscriber Line), downstream communication bandwidths are in many cases less than 1 Mbit/sec. Under such circumstances, if security patches are automatically updated in background while video content is being viewed and listened to in foreground, the QoE would deteriorate because of the ADSL communication bandwidth causing a bottleneck. In such a case, even by the solution of carrying out only the quality control of the communications directed to and from the terminal, there is a possibility of contributing to an improvement in the QoE of the user. In this solution, even if the terminal/network setting section 1320 does not control the settings of the network devices, it is possible to contribute to the improvement in the QoE only by the above-mentioned first option. In this case, the network communication optimizer 1310 can be installed and operated within the terminal 1110 rather than the network side, and then this facilitates the communication control apparatus to be implemented. In that case, however, in order to adapt the apparatus to a variety of servers providing a new application or communication service, it is preferable to update from the outside the application-specific quality database 1324 as needed. In this case, it is necessary that the terminal 1110 grasps the state of the network and that the available communication bandwidth be updated at all times. Techniques for controlling the transmission and reception bandwidths by a terminal for each application have conventionally been discussed. However, the apparatus wherein all components are arranged into a terminal is advantageous in updating the application-specific quality database from the outside and the update being incorporated in the network state grasper.

The second example introduces, as a method of controlling the QoS, an alternative solution of carrying out the quality control of communications directed to and from all the terminals accommodated in one ONU 1261. This solution naturally can take the same advantages in the same circumstances as the first example, and furthermore, when a larger number of terminals are installed in a house or local area, greater advantages can be enjoyed. The solution also can improve the QoE only by the above-mentioned first option without controlling the settings of the network devices by the terminal/network setting section 1320.

The third example introduces, as a method of controlling the QoS, another solution of carrying out the quality control of communications directed to and from the subscriber terminals accommodated in the OLTs 1266 to 1269. In the solution, when the communication bandwidth between the OLTs 1266 to 1269 and the ONU 1261 is shared by the plural subscribers and there is a bottleneck somewhere closer to the terminal than the OLTs 1266 to 1269, disadvantages otherwise caused by the bottleneck can effectively be avoided. In the PON wherein the communication bandwidth is shared by tens of subscribers, even if a bottleneck is in the above-mentioned range, the bandwidths of non-urgent communications can be restricted as described in respect of the first embodiment, thereby avoiding the disadvantages.

The fourth example introduces, as a method of controlling the QoS, a further solution of carrying out the quality control of communications directed to and from the subscriber terminals accommodated in the same switch. In the solution, when there is a bottleneck somewhere closer to the terminal than the WAN network of the switch concentrating traffic, disadvantages otherwise caused by the bottleneck can be avoided. Moreover, in a case where the switch assigns the communication bandwidth on the WAN to the interfaces of the terminals, the disadvantages can effectively be avoided by assigning the communication bandwidth according to the requisite QoS by means of the above-mentioned third or fourth option, in contrast with another case where the bandwidth is regularly assigned in simple proportion to the number of the OLTs 1266 to 1269 or the subscribers.

The fifth example introduces, as a method of controlling the QoS, still another solution of carrying out the quality control of communications directed to and from the subscriber terminals accommodated in the ADM ring node devices 1281 to 1284. In the solution, when there is a bottleneck somewhere closer to the terminal than the WAN network of the ADM ring node devices 1281 to 1284 of the local area ring network, disadvantages otherwise caused by the bottleneck can be avoided. The ADM ring node device may be installed in one telephone central office located in each city and the communication bandwidth is shared in each city.

The sixth example introduces, as a method of controlling the QoS, a still further solution of carrying out the quality control of communications directed to and from the subscriber terminals accommodated in the local area ring network. In the solution, when there is a bottleneck somewhere closer to the terminal than the gateway in the local area ring network, disadvantages otherwise caused by the bottleneck can be avoided. If the control of the solution is provided by means of the third or fourth option, the resources of the entire local area ring network can be optimally assigned according to subscriber requests. Moreover, if the control of traffic utilizing the resources is accepted by most subscribers, the whole traffic flowing through the gateway can be controlled.

The communication control apparatus of the first embodiment can be used to provide the QoS in accordance with the communication priority of an application and to improve the QoE of the user with hardly adding transmission resources or network equipment.

Although the prior art IntServ-based architecture must unify IntServ devices between endpoints, use of the communication control apparatus of the first embodiment makes such unification unnecessary.

In addition, although, in the prior art DiffServ-based architecture, a simple combination of the solutions respectively specific to the plural problems cannot result in satisfactory operation as a whole, the communication control apparatus of the first embodiment can achieve the satisfactory operation by the configuration of the first embodiment and newly introduced communication optimizers 1160 and 1310 which are respectively located on the sides of the terminal 1110 and the network. Therefore, even if the network resources are insufficient, the apparatus can optimize the QoS of each application and accomplish high QoE.

Now, the second embodiment of the present invention will be described in detail with reference to FIGS. 3A and 3B. In the first embodiment, the terminal communication optimizer 1160 and network communication optimizer 1310 optimizing the QoS are respectively located in the terminal 1110 and optimization control network 1300. By contrast, in the second embodiment, the components corresponding to the terminal communication optimizer 1160 and network communication optimizer 1310 are both located in at least one terminal 2100 and such an optimizing component is not required to be located on the network. However, if the optimizing component installed were simply shifted in location to one terminal 2100, the communication of the apparatus would be disabled from operating when the terminal 2100 is powered on. In order to prevent such a disablement from causing, all or some of the terminals 2100 are provided with a terminal coordinator 2120 that can replace the QoS optimizing components, such as the first communication optimizing functional section 1160 and a second communication optimizing functional section 2110, in an autonomous, distributed manner.

Figure 3A:
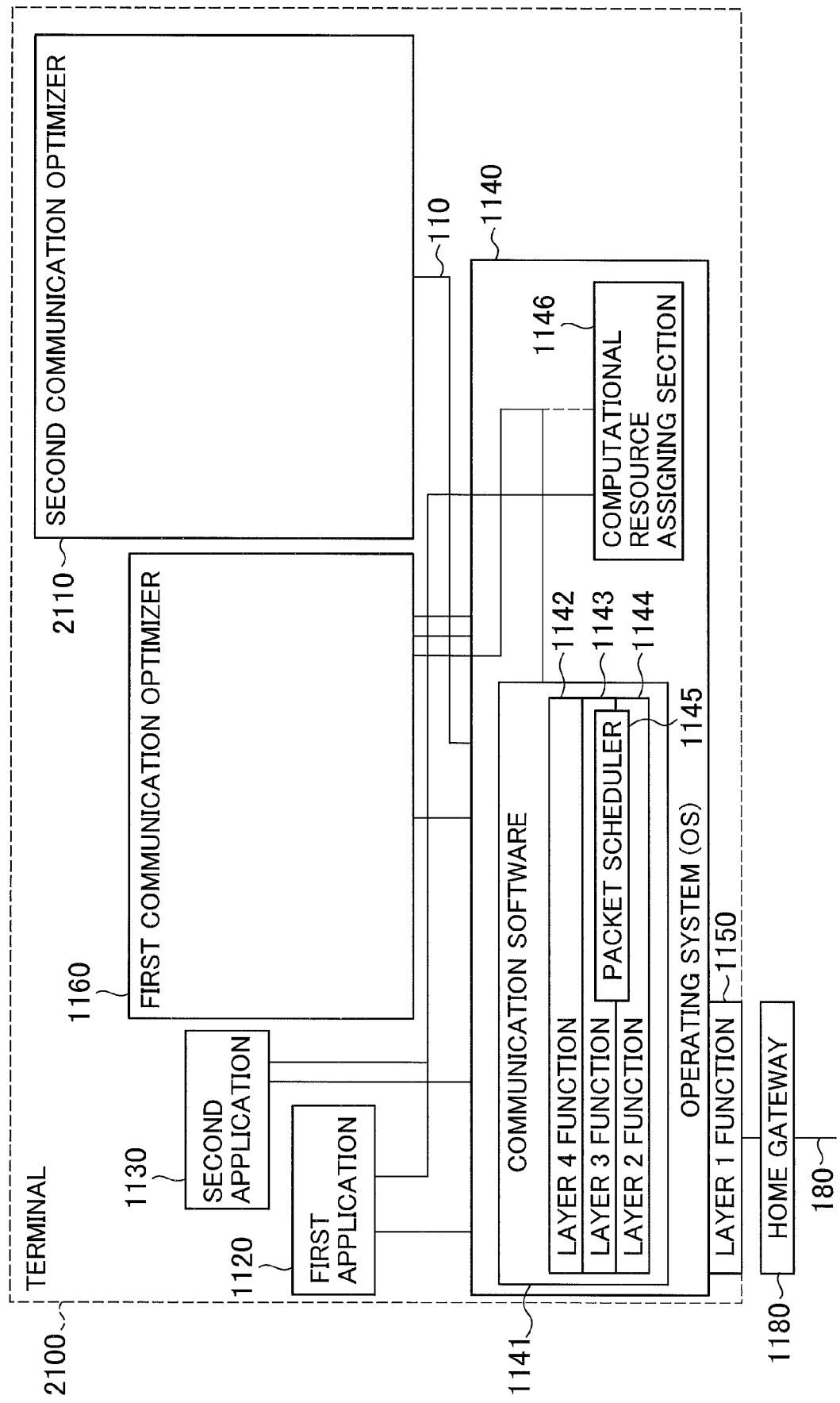
FIGS. 3A and 3B are schematic block diagrams showing a system including a communication control apparatus in accordance with a second embodiment of the present invention.
Figure 3B:
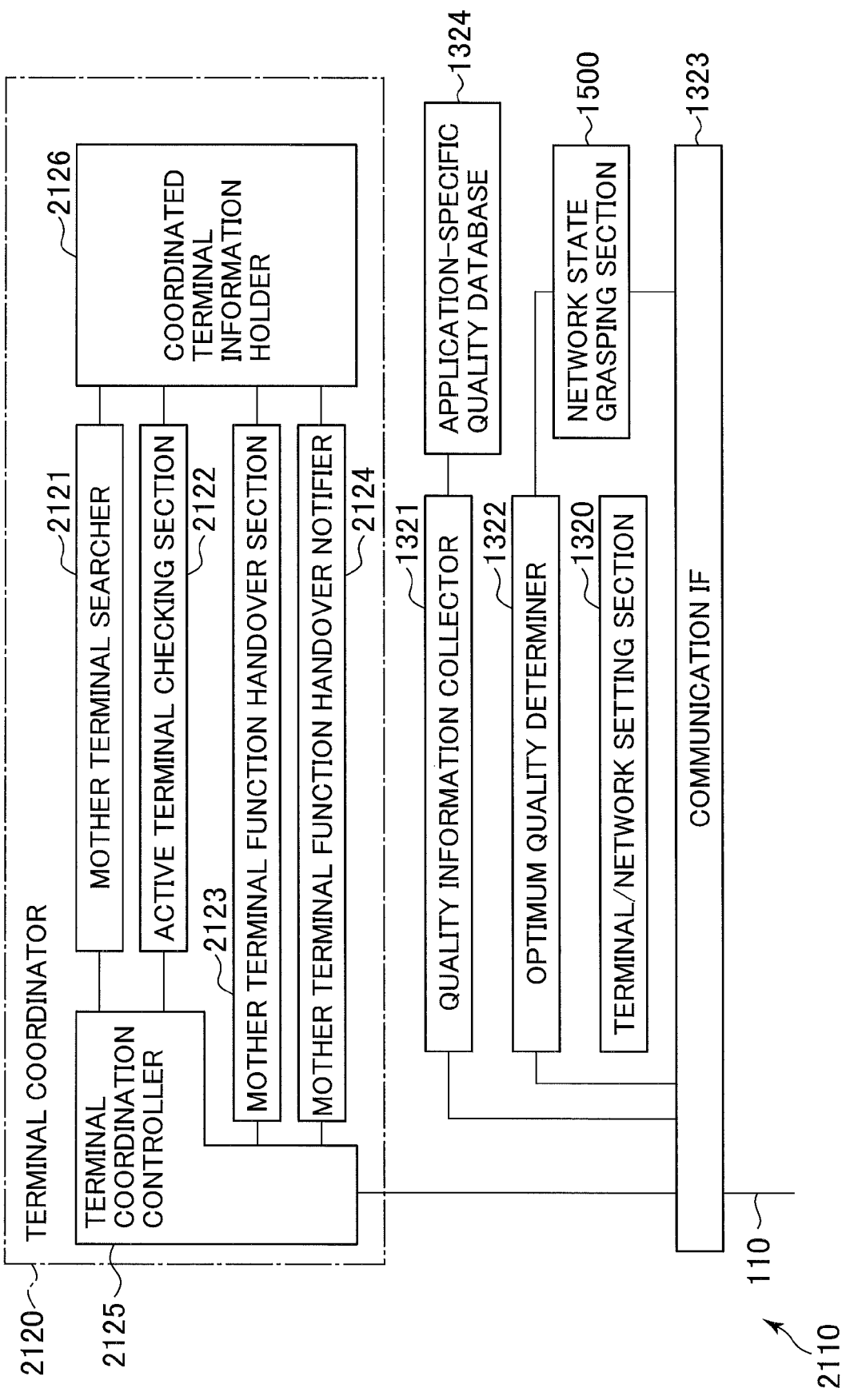

FIGS. 3A and 3B are schematic block diagrams showing a system including the communication control apparatus in accordance with the second embodiment of the present invention. In the specification and figures, like components are designated with the same reference numerals and symbols. In the second embodiment, the components corresponding to the terminal communication optimizer 1160 and network communication optimizer 1310 in the first embodiment are respectively referred to as the first communication optimizer 1160 and second communication optimizer 2110. The second embodiment may be similar in configuration to the first embodiment except that the second communication optimizer 2110 including the functions of the network communication optimizer 1310 of the first embodiment and the terminal coordinator 2120 are located on the side of the terminal 1110. Although the communication IF 1323 in the first embodiment is implemented by the communication software 1141 and layer 1 function 1150, it is enough to adapt the communication IF 1323 in the second embodiment to provide an interface with the communication software 1141 via a line 110.

The terminal coordinator 2120 of the second communication optimizer 2110 includes a mother terminal searcher 2121, an active terminal checking section 2122, a mother terminal function handover section 2123 and a mother terminal function handover notifier 2124. These components are controlled by a terminal coordination controller 2125 and can gain access to a coordinated terminal information holder or database 2126.

The mother terminal searcher 2121 of the second embodiment has a function of searching for a mother terminal. The active terminal checking section 2122 has a function of checking by means of a Keep Alive signal whether or not the terminal is active. The mother terminal function handover section 2123 has a function of handing over the role of the mother terminal to a daughter terminal. The mother terminal function handover notifier 2124 has a function of giving a notice to each terminal that the role of the mother terminal has been handed over to another terminal.

Although the second embodiment may be similar in operation to the first embodiment to optimize the QoS between each terminal and network devices, it is necessary that, before the optimizing operation of the second embodiment, a role of each terminal be determined and each terminal be informed of the role.

As such preceding processes of the optimizing operation, there is the simplest way of making all the users set their own terminals entirely in manual, but this way would impose heavy burden on the users. In another way for the preceding processes, an administrator may be selected to monitor all other terminals remotely on his or her terminal unit and to set the other terminals manually or automatically. However, because the apparatus of the second embodiment is fundamentally configured only by replacing some of the components of the first embodiment, if the administrator's terminal is halted, all the communication optimizing functions will be disabled. Accordingly, the second embodiment introduces an alternative way of improving, by autonomous, distributed control, a probability that any terminal is acting as the mother terminal.

In the second embodiment, when the terminal 2100 is powered on to be activated, the mother terminal searcher 2121 of the second communication optimizer 2110 first examines whether or not there is any other terminal controlling the QoS according to the application. The examination may be done by searching previously registered terminals and servers, or by broadcasting packets for examining whether or not there is any cooperatively operating terminal to check responses to the packets. As the result of the check, if the subject terminal receives no response, it acts as a mother terminal or server. Otherwise, it means that one of the terminals already in active is operating as a mother terminal, and thus the subject terminal acts as a daughter terminal or client. The handover of the authorization of the mother terminal may be determined not only on a first-come-first served basis, but also by detecting a terminal having higher performance in the mother terminal function handover section 2123 of each terminal exchanging performance information about the terminal with another. In a case of handing over the mother authorization, when there is already some other daughter terminal, the mother terminal function handover notifier 2124 gives a notice that the mother authority will be shifted.

Each daughter terminal periodically exchanges a Keep Alive message with the mother terminal by the active terminal checking section. When the daughter terminal cannot detect an active mother terminal, the daughter terminal checks, in the same way as when the power supply is turned on, whether or not there is any other mother terminal. If the check reveals that there is some other mother terminal, the subject daughter terminal recognizes the mother terminal as a server. Otherwise, the subject daughter terminal acts as a mother terminal and notifies the other daughter terminals that the subject terminal has become a candidate for a mother or that the mother terminal will be modified to the subject terminal. The other daughter terminal then checks, in accordance with the notice of the modification of the mother terminal, whether or not the prior active mother terminal can be detected. If the other daughter terminal's check reveals a prior active mother terminal being detected, then the other daughter terminal accepts the modification of the mother terminal. Otherwise, i.e. if the other daughter terminal can communicate with the prior mother terminal, the new mother terminal may be disregarded and the modification of the mother terminal is not accepted.

During that operation, a plurality of mother terminals might exist at the same time. Accordingly, the mother terminal will go to periodically checking, by the mother terminal searcher 2121, whether or not there is any other mother terminal. If the check by the mother terminal reveals that some other mother terminal is present, either of the subject and other mother terminals is selected and determined as the proper mother terminal, depending on terminal performance or using random numbers. According to the selection, when one terminal abandons its mother authority, it hands over its authority and responsibility for the mother terminal to another terminal remaining as a mother terminal by the mother terminal function handover section, and notifies the daughter terminals of the new mother terminal by the mother terminal function handover notifier.

Because the second communication optimizer 2110 of the mother terminal may be similar in operation to the network communication optimizer 1310 of the first embodiment, the other operation may be the same as the first embodiment. The mother terminal can act also as a daughter terminal by its own first communication optimizer and use its own second communication optimizer 2110 as a server.

The communication control apparatus of the second embodiment can be used to take the same advantages as the first embodiment. In addition, the apparatus makes some of the terminals on the client side act on behalf of the network communication optimizer 1310 operating as a server, and, when the terminal has become inoperative, makes another terminal take over the optimizing function. It is therefore possible to minimize a possibility that the control of the QoS is rendered disabled when the device authorized as the server breaks down.

Now, the third embodiment of the present invention will be described in detail with reference to FIGS. 4, 5 and 6. The communication control apparatus of the second embodiment may operate suitably, for example, in a case where terminals installed on the home network 1100 operate cooperatively, whereas, when the apparatus handles the terminal beyond the region of the home network 1100, there is a possibility that the mother terminal becomes overloaded. In view of this, two strategies will be discussed.

The first strategy constructs a grandmother terminal class above a mother terminal class and makes the grandmother terminal perform an optimization in a range wider than the mother terminal. For a range that cannot be supported by the grandmother terminal, a grand-grandmother terminal class may be constructed. Thus, according to a further extensive range that cannot be supported by the present classes, a higher terminal class may be constructed in hierarchy.

In the second strategy, the mother terminals adjust themselves in their equalized relationship with each other. If the mother terminals are too many to adjust, they may be separated into groups of a given range with a representative selected of each group so that the representatives negotiate with one another.

FIG. 4 is a schematic block diagram showing a second communication optimizer 3110 in a communication network including a communication control apparatus in accordance with a third embodiment of the present invention. FIG. 5 schematically illustrates how information flows through an access network in the communication network including the communication control apparatus according to the third embodiment. FIG. 6 schematically illustrates the flow of other information passing through the access network according to the third embodiment.

The second communication optimizer 3110 is provided with a terminal coordinator 3120 corresponding with the terminal coordinator 2120 of the second embodiment. The third embodiment may be similar in configuration to the second embodiment except for a grandmother terminal searcher 3121, an active grandmother/mother terminal checking section 3122, a grandmother terminal function handover section 3123 and a grandmother terminal function handover notifier 3124. These components are connected with the terminal coordination controller 2125 to operate according to an instruction from the controller 2125 and can access the common coordinated terminal information holder or database 2126.

In the third embodiment, the function corresponding with the active terminal checking section 2122 of the second embodiment is referred to as the active mother/daughter terminal checking section 2122, and checks the active mother terminal when the subject terminal acts as a daughter terminal and searches for daughter terminals when the subject terminal acts as a mother terminal. The third embodiment prepares two families consisting of respective quality information collectors 1321 and 3321, optimum quality determiners 1322 and 3322 and terminal/network setting sections 1320 and 3320. The one family operates for the mother terminal, while the other family operates for the grandmother terminal. Alternatively, in an application in which the third embodiment can be implemented by a single family, it is not necessary to prepare such two families.

In the third embodiment, after the subject terminal is powered on, the terminal coordination controller 2125 controls the mother terminal searcher 2121 to search for a mother terminal in the same way as in the second embodiment. When there is no mother terminal searched for, the subject terminal itself will act as a mother terminal. The terminal coordination controller 2125 of the mother terminal examines the performance of the subject terminal itself and determines a range that the mother terminal should support. The terminal coordination controller 2125 decides a range to support in such a fashion as, for example, within the range of the home network 1100 or within the range of terminals accommodated in the same of the OLTs 1266 to 1269.

When the mother terminal has received a connecting request from a daughter terminal, only if the daughter terminal is within the supportable range of the mother terminal, the mother terminal sends an ACK signal to the daughter terminal in response, and acts as a mother terminal for the daughter terminal. The third embodiment may be similar in operation of the mother terminal to the second embodiment such that the quality information collector 1321 operating for the mother terminal, i.e. a mother quality information collector, arranges information about the QoS taken from the application-specific quality database 1324 in accordance with the application information transmitted from the daughter terminal within its supportable range. In addition, the network state grasping section 1500 operates for the mother terminal to collect information about the state of the network, and then, on the basis of the arranged information and collected information, the optimum quality determiner 1322 operating for the mother terminal, i.e. a mother optimum quality determiner, determines set values, such as communication bandwidth, for controlling the QoS of communications between the daughter terminal and network devices. On the basis of the set values for the QoS control, the terminal/network setting section 1320 operating for the mother terminal, i.e. a mother terminal/network setting section, makes settings for the daughter terminal and network devices. The mother terminal function handover section 2123 and mother terminal function handover notifier 2124 may be similar in operation to the second embodiment.

The supportable range of the mother terminal includes not only the range in which daughter terminals are supported but also the range of the network that the mother terminal can control. For example, if the supportable range includes the range of the home network 1100, the mother terminal can support also the control of the communication bandwidth of the home gateway 1180. If the supportable range includes the terminals accommodated in the OLTs 1266 to 1269, the mother terminal can support also the control of the bandwidth in assigning the communication bandwidth of the same of the OLTs 1266 to 1269.

Next, the terminal coordination controller 2125 of the mother terminal controls the grandmother terminal searcher 3121 to search for a grandmother terminal. If no grandmother terminal is found, the terminal which searched for a grandmother terminal, i.e. the mother terminal, acts as a grandmother terminal. The terminal coordination controller 2125 of the grandmother terminal determines the range that the grandmother terminal should support. The operation of the grandmother terminal for the mother terminal may substantially be the same as the mother terminal for the daughter terminal.

In the grandmother terminal, the quality information collector 3321 operating for the grandmother terminal, i.e. a grandmother quality information collector, receives, from the subordinate mother terminal, information collected of applications in the supportable range of the mother terminal and obtains QoS information requisite for each application with reference to values in the application-specific quality database 1324. In addition, the network state grasping section 1500 operates for the grandmother terminal to collect information about the state of the network, and then, on the basis of the collected information, the optimum quality determiner 3322 operating for the grandmother terminal, i.e. a grandmother optimum quality determiner, determines setting values, such as communication bandwidths, for controlling the QoS of communications between the mother terminal and network devices. On the basis of the set values for the QoS control, the terminal/network setting section 3320 operating for the grandmother terminal, i.e. a grandmother terminal/network setting section, notifies the network state grasping section in the mother terminal of information about the resources that can be used by the mother terminal, and performs setting of network devices in the supportable range of the grandmother terminal. For example, when the supportable range of the mother terminal is within the home network 1100 and the supportable range of the grandmother terminal includes components to the OLTs 1266 to 1269, the grandmother terminal makes settings of the communication bandwidth on the OLTs 1266 to 1269 for each subscriber, and gives a notice of the assigned communication bandwidths to the mother terminals located in each subscriber. On the basis of the notified information, the mother terminals operate to set the transmitting communication bandwidths of home gateway devices and terminals.

Figure 5:
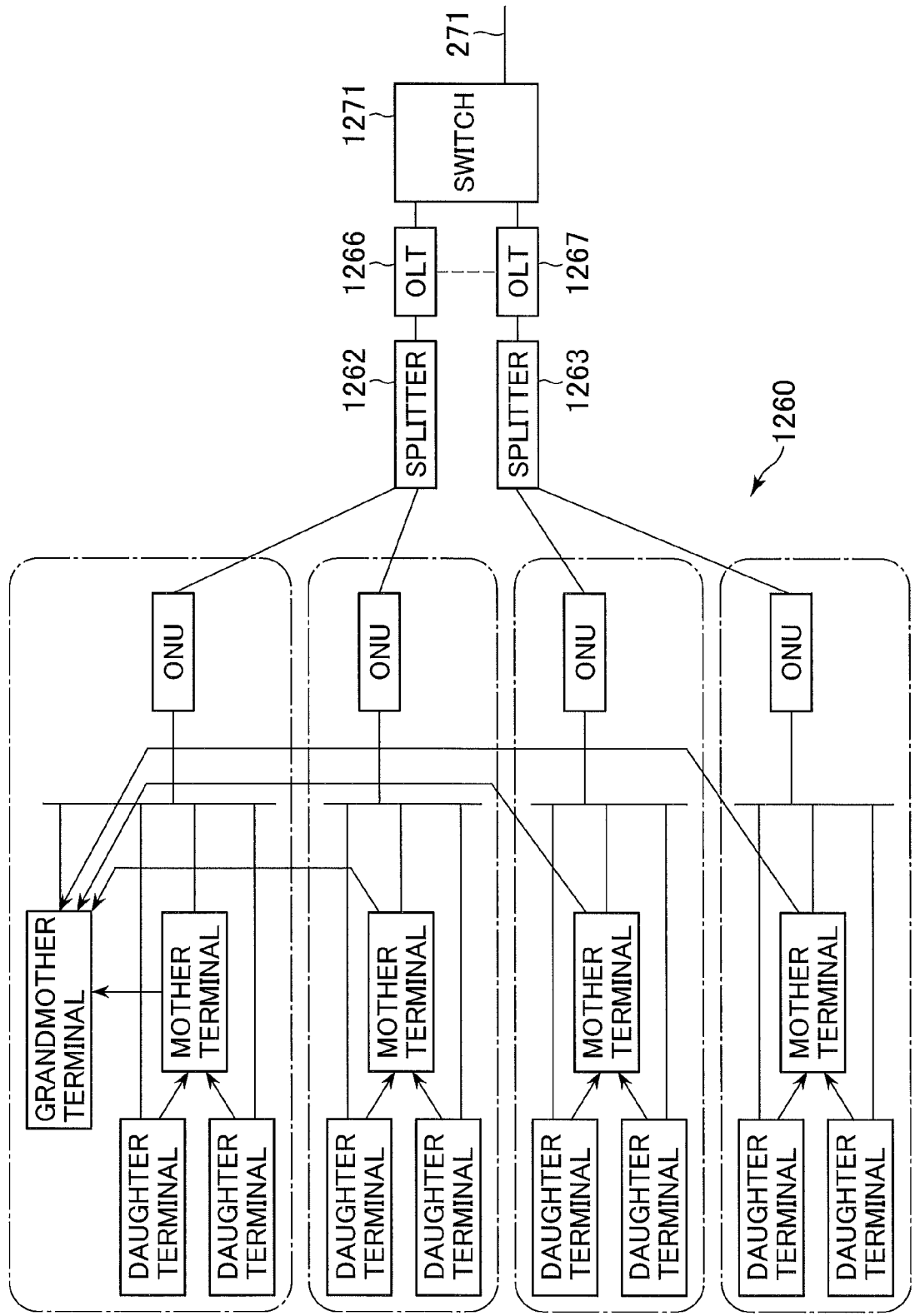
FIG. 5 schematically illustrates the flow of information through an access network in the communication network including the communication control apparatus according to the third embodiment.
Figure 6:
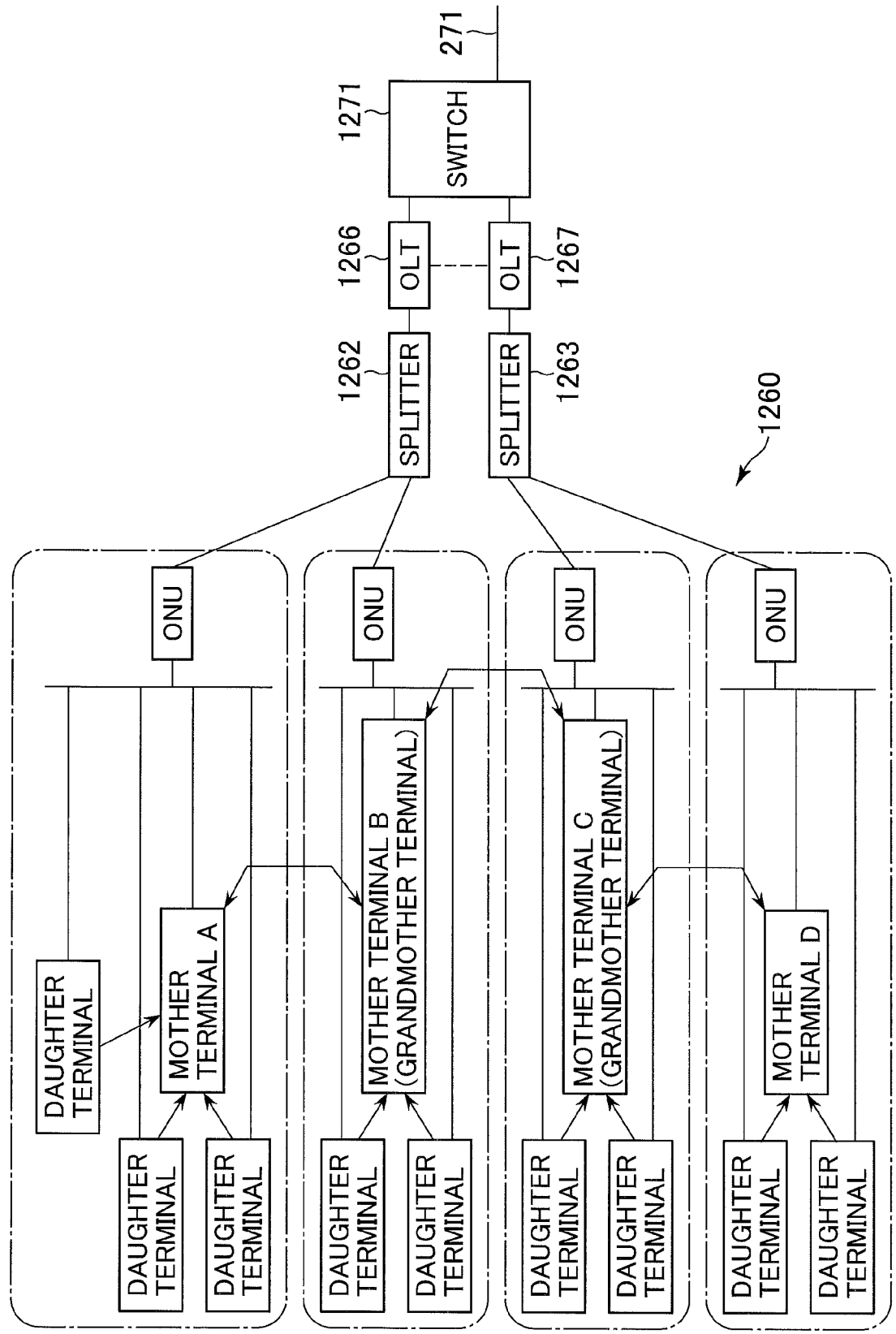
FIG. 6 schematically illustrates the flow of other information through the access network in the communication network including the communication control apparatus according to the third embodiment.

The flow of the above-described information is shown in FIG. 5, which is directed to a case in which the supportable range of the grand-grandmother terminals includes components to the OLTs 1266 to 1269 accommodated in the same switch, and the supportable range of the mother terminal is within the home network 1100. In FIG. 5, the authority of the grand-grandmother terminal has been handed over to another terminal from the original mother terminal by the mother terminal function handover section.

Furthermore, the operation in the second strategy will be described with reference to FIG. 6. The second strategy may be similar to the first strategy, but the grandmother terminal does not determine the communication bandwidths of the mother terminals, but alternatively the mother terminals exchange information between each other to determine their mutual requisite QoS. Although the QoS of the mother terminals may be determined by consultation or negotiations relying on requests and concessions between the mother terminals, there is a possibility that the consultation breaks down. In order to avoid such a breakdown, the mother terminals may be constructed to operate with algorithm exactly common to all mother terminals such as to exchange information with each other and to output the same determining results.

The grandmother terminal representative of plural mother terminals may exchange information with another grandmother terminal prior to determining network resources used mutually. In FIG. 6, each mother terminal assigns the communication bandwidth for the home network 1100, and further assigns the communication bandwidth together with other mother terminals accommodated in the same of OLTs 1266 to 1269. The grandmother terminal grasps the states of applications loaded in the OLTs 1266 to 1269 and coordinates with other grandmother terminals to determine and control the QoS, such as assignment of the communication bandwidth, of the OLTs 1266 to 1269 accommodated in the same switch.

Thus, the communication control apparatus of the third embodiment can be used to take the same advantages as the first and second embodiments, and additionally, to take further advantage that the QoS control can be performed over a wider range.

Figure 7A:
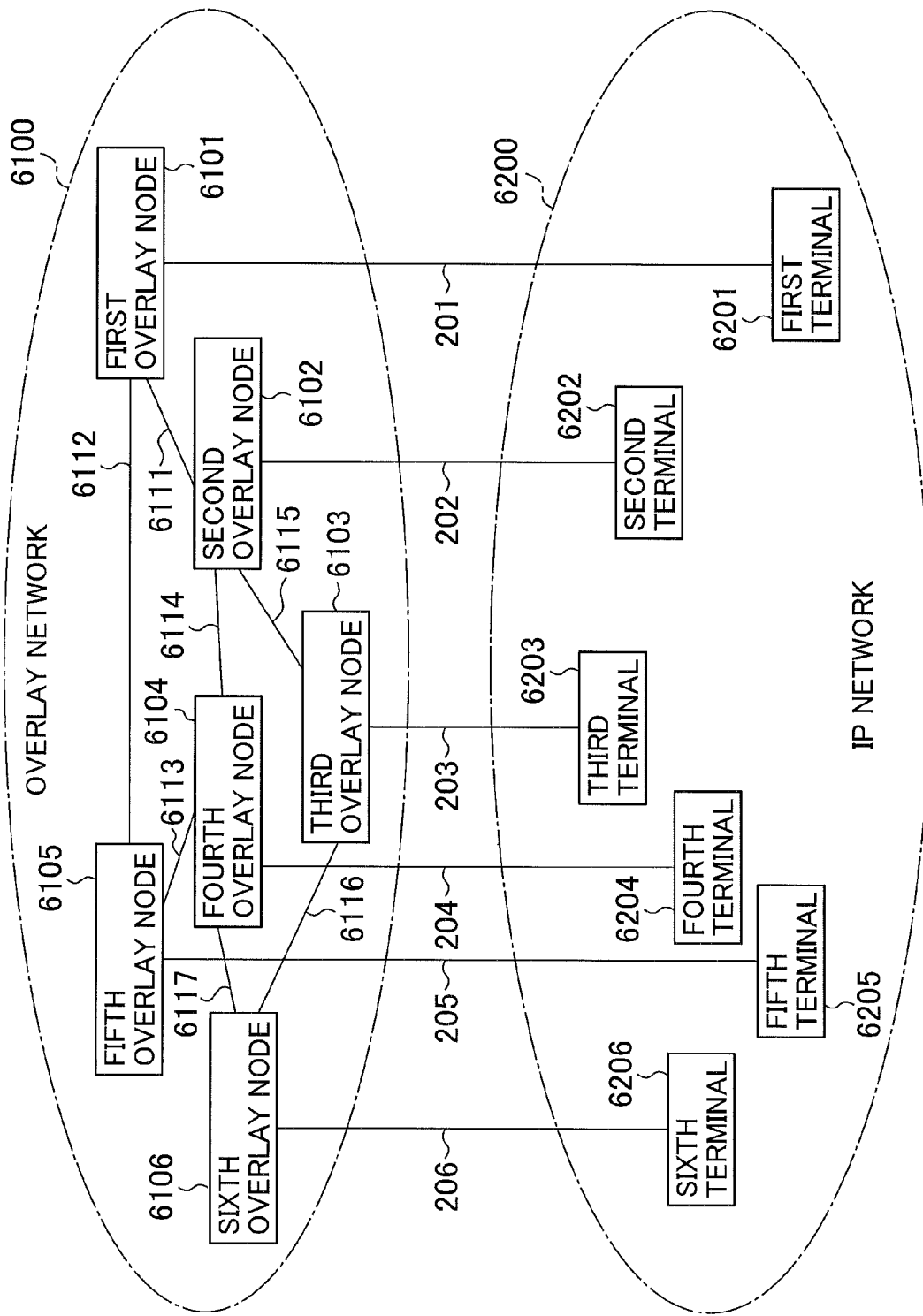
FIGS. 7A and 7B are schematic block diagrams showing a system including a communication control apparatus in accordance with a fourth embodiment of the present invention.
Figure 7B:
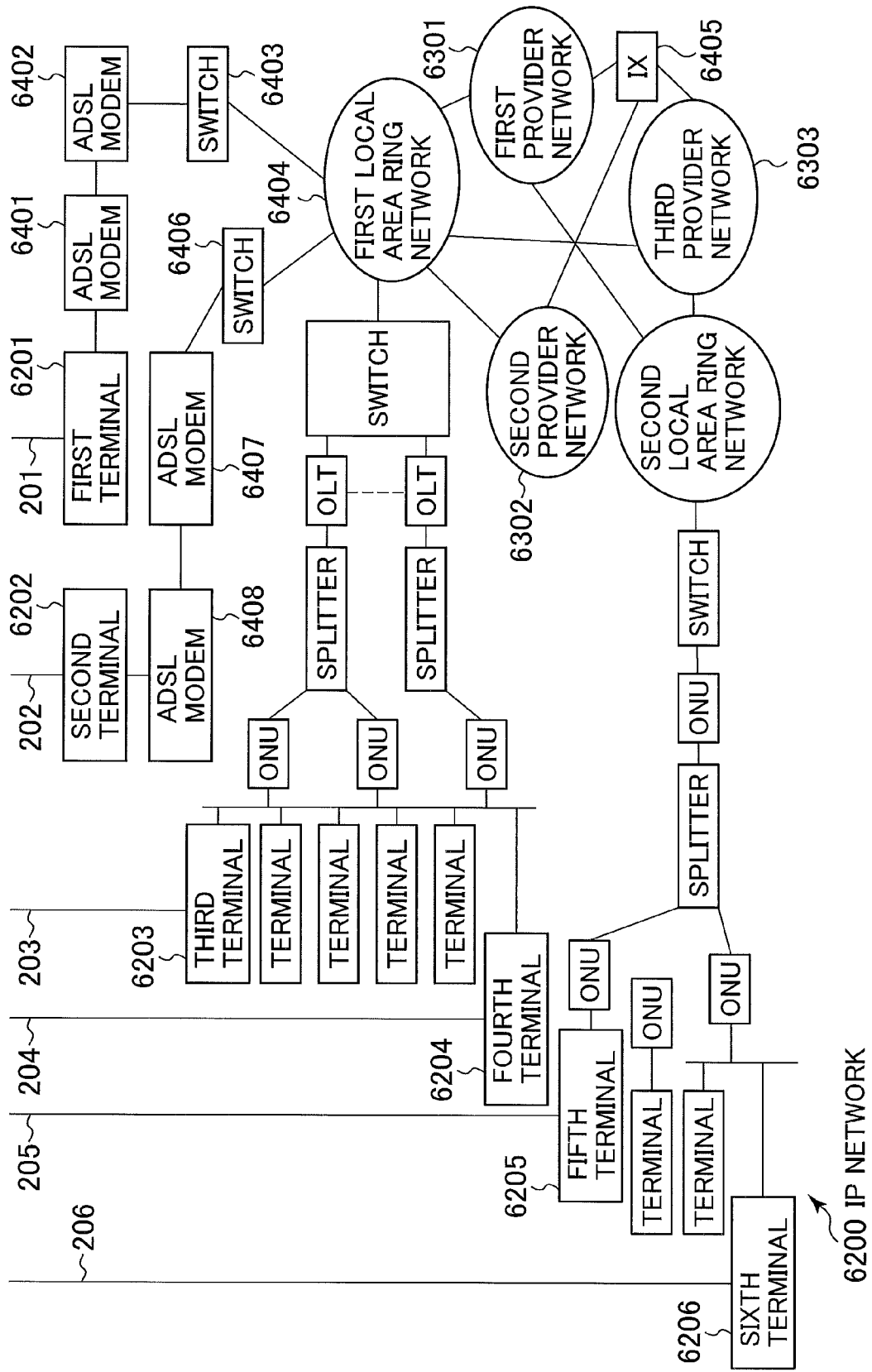
Figure 8:
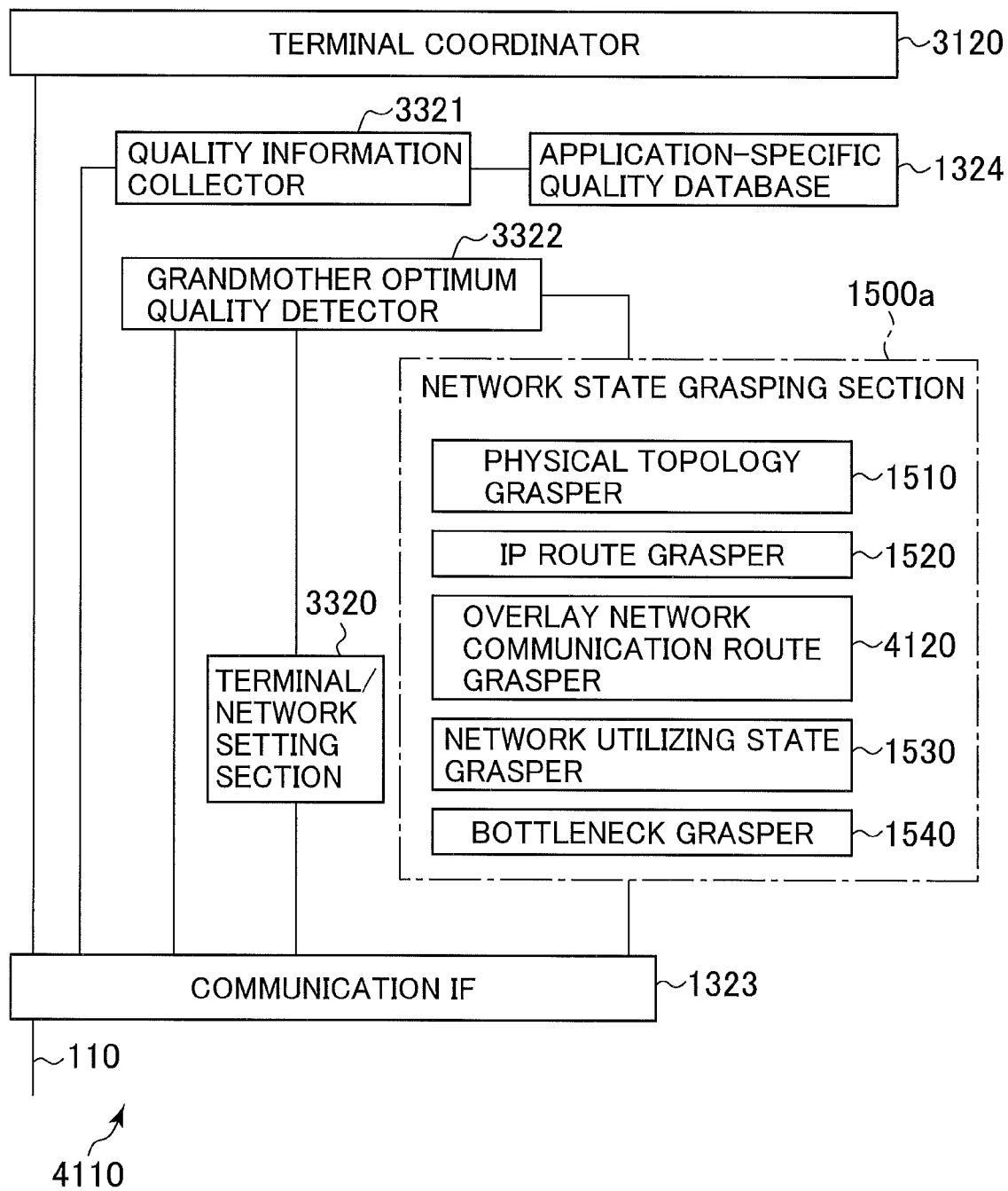
FIG. 8 is a schematic functional diagram showing a second communication optimizer in the communication network including the communication control apparatus according to the fourth embodiment.
Figure 9:
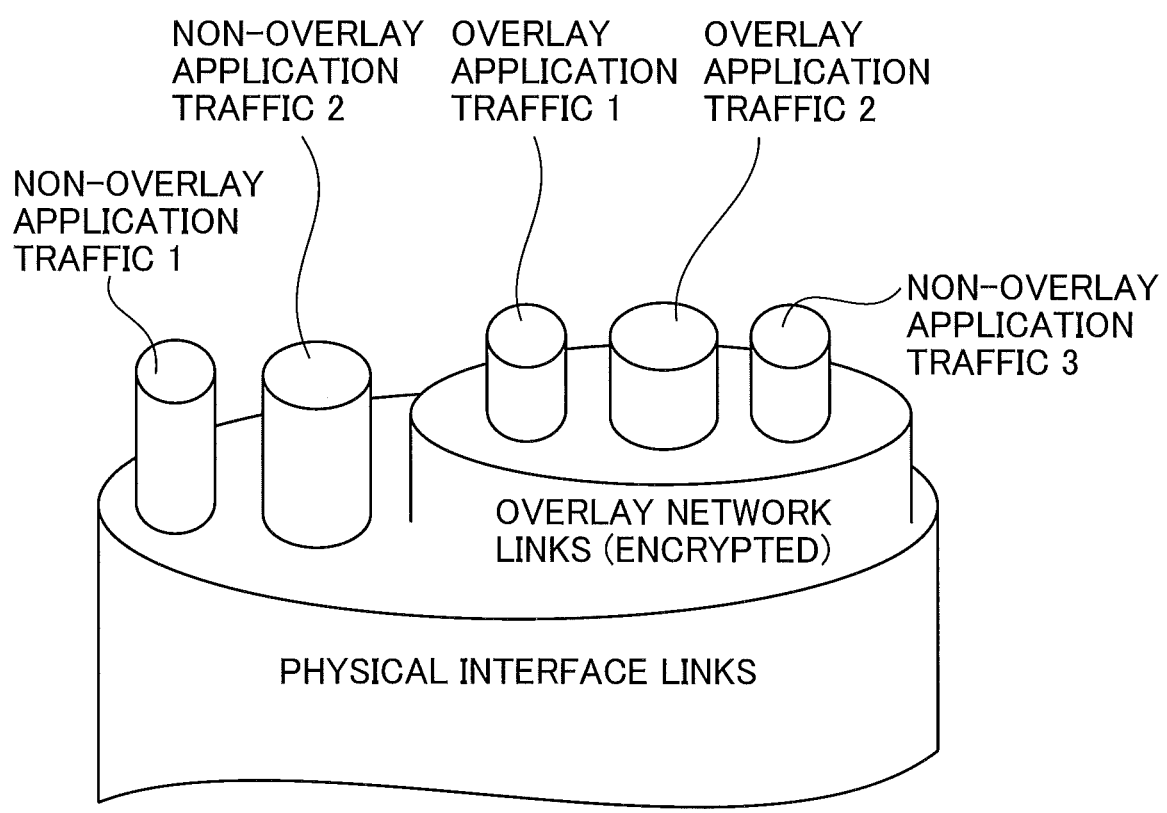
FIG. 9 schematically illustrates physical interface links in the communication network including the communication control apparatus according to the fourth embodiment.

Now, the fourth embodiment of the present invention will be described in detail with reference to FIGS. 7A, 7B, 8 and 9. FIGS. 7A and 7B schematically show the configuration of a system including a communication control apparatus in accordance with the fourth embodiment of the present invention. FIG. 8 schematically shows the configuration of a second communication optimizer included in the communication control apparatus of the fourth embodiment. FIG. 9 conceptually illustrates physical interface links included in the communication control apparatus of the fourth embodiment.

In recent years, overlay networks have been frequently used, wherein an IP network is used as resources and another network is built thereabove in hierarchy. An example of the overlay network 6100 is shown in FIGS. 7A and 7B. The overlay network 6100 is provided with first to sixth overlay nodes 6101 to 6106 respectively connected to first to sixth corresponding terminals 6201 to 6206 via lines 201 to 206 and first to seventh overlay links 6111 to 6117 for interconnecting the first to sixth overlay nodes 6101 to 6106, respectively. A VPN or P2P network can be used as the overlay network 6100, and then the topology on the overlay network 6100 does not always agree with the topology on the IP network 6200. In FIG. 7A, transfer of data from the third overlay node 6103 owing to the third terminal 6203 to the fourth overlay node 6104 owing to the fourth terminal 6204 is effected on a route going either through the sixth overlay link 6116, sixth terminal 6206 and seventh overlay link 6117 or through the fifth overlay link 6115, second terminal 6202 and fourth overlay link 6114.

The routes in the IP network may often be different from the optimum path in the physical network. In FIG. 7, traffic from the third terminal 6203 of a subscriber registered with the first provider network 6301 to the fourth terminal 6204 of another subscriber registered with the second provider network 6302 is transferred through the first terminal 6201, an ADSL modem 6401, another ADSL modem 6402, a switch 6403, a first local area ring network 6404, the first provider network 6301, an IX (Internet exchange) 6405, the second provider network 6302, the first local area ring network 6404, the switch 6406, still another ADSL modem 6407, further still another ADSL modem 6408 and the second terminal 6202 in this order.

Although an optimum route would be obtained physically if the route were turned back at each switch, such a routing path may not be always taken in practice. Furthermore, the node connecting topology and the traffic route on the overlay network 6100 may be different from those on the IP network 6200. It would be preferable to route with the physically shortest distance or the minimum number of hops, but the node connecting topology and the traffic route on the overlay network 6100 may not always be coincident with the route on the IP network 6200 for the following reasons: (1) A subscriber receiving IP services is registered with a provider, so that traffic first flows through the provider network; (2) Routes between providers heavily depend on the roles decided between the providers; (3) A circuitous route in a physical view may provide the maximum throughput in practice because of the thickness of the connecting line between a local area network and a provider network or the thickness of the network line between providers; and (4) The topology of the overlay network 6100 may be determined by policies, such as the actual achievements of the amount of transferred files and the contributed achievements.

As described in respect of the first embodiment, it is important for optimizing the QoS by the communication control apparatus of the present invention to grasp the route and a bottleneck and to decide, regardless of the bottleneck, whether or not the QoS can be controlled. Although it is relatively easier to grasp the route on the IP network 6200, another route on the overlay network 6100 may be different from the route on the IP network 6200 and not be easy to grasp the other route. In FIGS. 7A and 7B, it may be uncertain whether traffic transferred from the first overlay node 6101 to the fourth overlay node 6104 goes through the second overlay node 6202 or the fifth overlay node 6205. Traffic transmitted from an application is encrypted together with traffic transmitted from another overlay node as shown in FIG. 9 and transferred on an overlay link to still another overlay node. However, even if the communication interface at a relay node inspects the traffic with encrypted payload, it may often be difficult to decide whether the traffic originated by the previous stage of node as a source or was transmitted from another source node and relayed by the previous stage of node.

Those difficulties have been overcome by the fourth embodiment in which, as shown in FIG. 8, a network state grasping section 1500a and a second communication optimizer 4110 are respectively correspondent with the network state grasping section 1500 and the second communication optimizer 2110 of the second embodiment, and furthermore the grasping section 1500a is provided with an overlay network route grasper 4120 to grasp the route for application traffic passing on the overlay network. The bottleneck grasper 1540 adds information about the terminals of transmitting and receiving the traffic and about applications written in the overlay link to the network utilizing state information, in addition to the bottleneck information. The overlay network path grasper 4120 may be implemented in which the amount of traffic transmitted, for example, by an application for implementing the overlay network, such as Skype (trademark) or Winny, is made varied to thereby observe whether or not the variation has caused a variation in traffic flowing through another node of the overlay network and to estimate the route according to the observation. Alternatively, to implementing the overlay network path grasper 4120, for example, the overlay traffic detection system and traffic monitoring control system disclosed by Japanese patent laid-open publication No. 2009-049458, described earlier, is applicable.

The fundamental operation of the fourth embodiment may be similar to the operation of the first, second and third embodiments except that information regarding the overlay network 6100 is contained in the network utilizing state information used by the optimum quality determiner 3322 which also uses the requisite QoS information for each terminal. Consequently, if the overlay network 6100 is contained in the bottlenecked link, information about element traffic contained in the overlay link can be obtained. Then, a decision is made as to whether or not it is possible to perform the QoS control which gives higher QoS to the application having higher communication priorities among various applications including communication applications separately used by terminals on the overlay network 6100. If possible, optimization control of the QoS may be performed.

Thus, the communication control apparatus of the fourth embodiment can be used to take the same advantages as the first to third embodiments. Additionally, the apparatus can control the optimization of the QoS depending upon the communication priority of applications even when the network carries traffic on the overlay network in which plural kinds of traffic are merged and then encrypted.

Now, the fifth embodiment of the present invention will be described in detail with reference to FIG. 10. The communication control apparatus described in respect of the first to fourth embodiments can control the priority of communication according to applications without deteriorating the QoE of the user even in the case of network resources being restrictive. The fifth embodiment takes as the first restricting condition the maximum power consumption being limited or leveled off, and under that condition controls the priority of communication according to applications while preventing the QoE of the user from deteriorating. The control makes it possible to maintain the QoE of the user higher, even if peak power limitations are imposed, for example, in summer.

Figure 10:
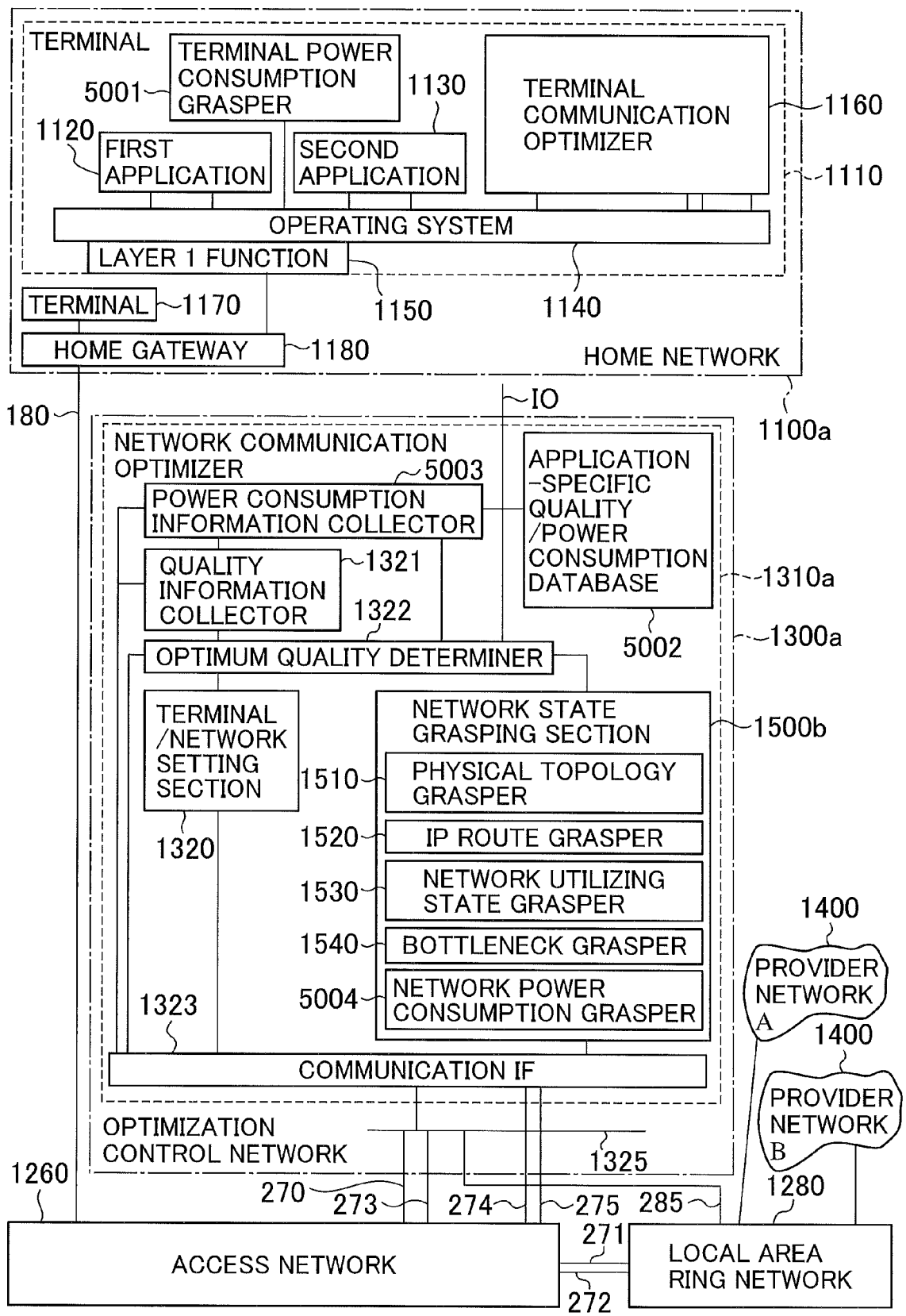
FIG. 10 is a schematic block diagram showing a system including a communication control apparatus in accordance with a fifth embodiment of the present invention.

FIG. 10 schematically shows the configuration of a system including a communication control apparatus according to the fifth embodiment of the present invention. The fifth embodiment shown in FIG. 10 may be similar in configuration to the first embodiment except that a terminal 1100*a* comprises a terminal power consumption grasper 5001 and that a network communication optimizer 1310*a* comprises a power consumption information collector 5003, an application-specific quality/power consumption database 5002 and a network state grasping section 1500*b* including a network power consumption grasper 5004.

The terminal power consumption grasper 5001 in the terminal 1100*a* gains access to the OS 1140 to gather information about various hardware devices, not shown, such as CPU, chip set, memory, magnetic disk drive, communication interfaces and monitor, the used OS 1140 and resident software, and to gather information about the power consumption such as the CPU utilization information and transfer the gathered information to the network communication optimizer 1310*a*. The grasper 5001 also may include a measurement section for measuring the power consumption of the terminal to acquire information about the measured power consumption or acquire information permitting estimation of the power consumption, and then add the acquired information to the first information.

The power consumption information collector 5003 in the network communication optimizer 1310*a* estimates the electric power consumed by each terminal on the basis of information obtained from the terminal power consumption grasper 5001, information about the using application gathered by the quality information collector 1321 and information from the application-specific quality/power consumption database 5002 disposed instead of the application-specific quality database 1324, and gives a notice of the estimated power to the optimum quality determiner 1322.

In addition, the network state grasping section 1500*b* on the network side is provided with the power consumption grasper 5004 for collecting and grasping the power consumption information about the network equipment. The power consumption grasper 5004 transfers the power consumption information about the network equipment to the optimum quality determiner 1322. The optimum quality determiner 1322 also receives information IO on the maximum allowable power consumption inputted either by a setting operation performed by maintenance personnel or via a network.

According to the above-described configuration, the optimum quality determiner 1322 can collect the maximum allowable power consumption information IO, the power consumption information of terminals and network and information about the applications, required QoS and network utilizing state. On the basis of those kinds of information, the optimum quality determiner 1322 permits communications of the requisite QoS for a higher-priority application within the limit not exceeding the maximum allowable power consumption and within the limit permitted by the available network resources. Furthermore, the determiner 1322 determines or calculates control information, or second information, enabling communications of a lower-priority application in such a way that communications of the higher-priority application are not hindered. The determiner 1322 also transfers the determined results from the determination to the NE-OpSs of the terminals and network via the terminal/network setting section 1320 to make the NE-OpSs perform operation at the specified QoS.

Thus, the communication control apparatus of the fifth embodiment can be used to take the same advantages as the first to fourth embodiments. Additionally, the apparatus controls the approximately maximum values of the power consumption of the network and terminals within the suitable limit.

The entire disclosure of Japanese patent application No. 2010-17099 filed on Jan. 28, 2010, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication control apparatus for controlling communications between a terminal and a network device, comprising a first communication optimizer and a second communication optimizer, said first communication optimizer including:
a first acquirer for acquiring first information about applications running on the terminal and communication destinations of the applications;
a transferrer for transferring the first information to said second communication optimizer; and
a setter for setting Quality of Service (QoS) for each of the applications according to second information which is instruction information from said second communication optimizer, said second communication optimizer including:
a second acquirer for acquiring third information indicating the QoS requisite for the application indicated by the first information and for acquiring fourth information about a state of the network;
a decider for deciding, on a basis of the third and fourth information, whether or not there is a network resource requisite for the application indicated by the first information;
a communication instructor for determining the second information according to a result from a decision of said decider,
said communication instructor applying to the second information, if there are the network resources requisite for the applications, the instruction information instructing communications at the QoS requisite for each application, and, if the network resources are insufficient for the applications, another instruction information instructing the terminal and the network device to set resource assignment and a transmitting order so that a higher communication priority application communicates at a first QoS and a lower communication priority application communicates within a limit not deteriorating the first QoS; and a transmitter for transmitting the second information to said first communication optimizer and to the network device.

2. The apparatus in accordance with claim 1, wherein said first communication optimizer is located within the terminal, and said second communication optimizer is located in an optimizing controlling network outside the terminal.

3. The apparatus in accordance with claim 1, wherein said first information includes information indicating whether the application in the terminal is running in foreground or in background, and/or information based on operation by a user on the application.

4. The apparatus in accordance with claim 1, wherein said first communication optimizer has a manufacturer certifier for holding information certifying a manufacturer of said first communication optimizer.

5. The apparatus in accordance with claim 1, wherein the fourth information about the state of the network acquired by said second communication optimizer includes information about states of utilizing a node and a link in the network and information about an available communication bandwidth.

6. The apparatus in accordance with claim 1, wherein said communication instructor modifies a setting of a packet transmission scheduler incorporated in communication software to vary a communication priority and/or a communication bandwidth of a transmitting packet for each of the applications.

7. The apparatus in accordance with claim 1, wherein said communication instructor lowers a transmission rate of an upstream acknowledgment signal responding to reception to control a communication bandwidth, thereby reducing downstream traffic.

8. The apparatus in accordance with claim 1, wherein said communication instructor sets a field value for a service type of an Internet protocol (IP) packet according to the priority of the communications.

9. The apparatus in accordance with claim 1, wherein said communication instructor makes a setting for the resources or the transmission order permitting communications at the QoS requisite for the higher communication priority application, and transfers traffic of the application having the higher communication priority by using a tunneling technique.

10. The apparatus in accordance with claim 1, wherein said communication instructor identifies the applications on the basis of information about an address, a port number and a protocol number of each transmitting and receiving device, and narrows a communication bandwidth or delays the transmission order of the application having the lower communication priority to thereby improve the QoS of the application having the higher communication priority.

11. The apparatus in accordance with claim 1, wherein said communication instructor narrows a communication bandwidth or delays the transmission order of the application having the lower communication priority by using communication software and a layer 1 function to thereby improve the QoS of the application having the higher communication priority.

12. The apparatus in accordance with claim 1, wherein said communication instructor increases or reduces a central processor unit (CPU) time of each of the applications to adjust an amount of the communications.

13. The apparatus in accordance with claim 1, wherein, when a gateway device located between the terminal and the network device is a bottleneck, said communication instructor assigns the resources and/or sets the transmission order to permit traffic of the applications in the terminal to pass through the gateway device at the QoS requisite for the higher communication priority application and to carry out the communications using the lower communication priority application within the limit not hindering the assignment of the resources and/or a setting of the transmission order.

14. The apparatus in accordance with claim 1, wherein said first and second communication optimizers are both located in the terminal, said second communication optimizer including a terminal coordinator for performing control such that said terminal operates cooperatively with another terminal, an inquiry signal being transmitted, when said terminal is activated, to one or more predetermined other terminals or to all terminals which can be notified, and then said terminal coordinator being activated into operation when no response is received to the inquiry signal from any of the terminals.

15. The apparatus in accordance with claim 14, wherein one of the other terminals is provided with a terminal coordinator for making the one terminal operate cooperatively with another of the terminals, said second communication optimizer comprising a first active terminal checker for checking whether or not the one terminal is active.

16. The apparatus in accordance with claim 15, wherein said terminal comprises:
    a first terminal function handover section for handing over a role of said second communication optimizer to another terminal; and
    a first terminal function handover notifier for notifying, when the role of said second communication optimizer is handed over to the other terminal, the handover to the other terminals.

17. The apparatus in accordance with claim 14, wherein said second communication optimizer comprises a second active terminal checker for checking other active terminal having another terminal coordinator for performing control such that the other active terminal operates cooperatively with another terminal.

18. The apparatus in accordance with claim 17, wherein said terminal comprises:
    a second terminal function handover section for handing over a role of said second communication optimizer to another terminal; and
    a second terminal function handover notifier for notifying, when the role of said second communication optimizer is handed over to the other terminal, the handover to the other terminals.

19. The apparatus in accordance with claim 1, wherein said second communication optimizer comprises:
    a first finder for finding an application on an overlay network, an amount of traffic of the application and a route in logical topology on the overlay network to transfer the application, the amount of traffic and the route to said first communication optimizer; and
    a second finder for finding a corresponding relationship between a node in the logical topology on the overlay network and its physical node to transfer the found relationship to said first communication optimizer.

20. The apparatus in accordance with claim 1,
    wherein said first communication optimizer includes a third acquirer for acquiring information about a power consumption measured by a measurement section measuring the power consumption of the terminal or information permitting estimation of the power consumption, and adding the acquired information to the first information to transmit the first information to said second communication optimizer, said second communication optimizer including a terminal power consumption information collector for receiving the first information, and a network power consumption information grasper for collecting information about a power consumption of network equipment, said communication instructor instructing the terminal and the network equipment to assign the resources or to set the transmission order within the limit not exceeding a maximum allowable power consumption set from the outside and below a limit permitted by the available network resources.

* * * * *